(12) United States Patent
Schmolke et al.

(10) Patent No.: US 11,291,994 B2
(45) Date of Patent: Apr. 5, 2022

(54) CARTRIDGE, ANALYSIS SYSTEM AND METHOD FOR TESTING A SAMPLE

(71) Applicant: Boehringer Ingelheim Vetmedica GmbH, Ingelheim am Rhein (DE)

(72) Inventors: Hannah Schmolke, Didderse (DE); Guenter Bruckmann, Wuerselen (DE); Matthias Kronsbein, Kaiserslautern (DE); Lutz Weber, Zweibruecken (DE); Rene Wirt, Wuppertal (DE)

(73) Assignee: BOEHRINGER INGELHEIM VETMEDICA GMBH, Ingelheim am Rhein (DE)

( * ) Notice: Subject to any disclaimer, the term of this patent is extended or adjusted under 35 U.S.C. 154(b) by 0 days.

(21) Appl. No.: 16/871,079

(22) Filed: May 11, 2020

(65) Prior Publication Data
US 2020/0269240 A1 Aug. 27, 2020

Related U.S. Application Data

(62) Division of application No. 15/725,358, filed on Oct. 5, 2017, now Pat. No. 10,682,644.

(30) Foreign Application Priority Data

Oct. 7, 2016 (EP) .................... 16020386

(51) Int. Cl.
*B01L 3/00* (2006.01)
*F16K 99/00* (2006.01)

(52) U.S. Cl.
CPC ... *B01L 3/502715* (2013.01); *B01L 3/502738* (2013.01); *F16K 99/0015* (2013.01); *F16K 99/0034* (2013.01); *B01L 2300/0816* (2013.01); *B01L 2300/0861* (2013.01); *B01L 2300/0887* (2013.01); *B01L 2300/123* (2013.01); *B01L 2400/0481* (2013.01); *B01L 2400/0638* (2013.01); *B01L 2400/0655* (2013.01);
(Continued)

(58) Field of Classification Search
CPC ....... F16K 2099/008; F16K 2099/0084; F16K 99/0015; F16K 99/0034; B01L 3/502715; B01L 3/502738; B01L 2300/0816; B01L 2300/0861; B01L 2300/0887; B01L 2300/123; B01L 2400/0481; B01L 2400/0638; B01L 2400/0655; Y10T 436/11; Y10T 436/25; Y10T 436/2575
USPC .... 436/43, 174, 180; 422/63, 502, 503, 537, 422/539
See application file for complete search history.

(56) References Cited

U.S. PATENT DOCUMENTS

| | | |
|---|---|---|
| 5,096,669 A | 3/1992 | Lauks et al. |
| 5,863,801 A | 1/1999 | Southgate et al. |
| 5,864,801 A | 1/1999 | Sugiyama et al. |
| 7,998,708 B2 | 8/2011 | Handique et al. |
| 8,691,592 B2 | 4/2014 | Chen et al. |

(Continued)

FOREIGN PATENT DOCUMENTS

| | | |
|---|---|---|
| CN | 103695308 A | 4/2014 |
| EP | 2 657 708 A1 | 10/2013 |
| GB | 816035 A | 7/1959 |

*Primary Examiner* — Maureen Wallenhorst
(74) *Attorney, Agent, or Firm* — David S. Safran; Roberts Calderon Safran & Cole, P.C.

(57) ABSTRACT

A cartridge, an analysis system and a method for analyzing, in particular, a biological sample, wherein a first group having one or more valves and a second group having one or more valves can be or are actuated from different sides of the cartridge.

21 Claims, 6 Drawing Sheets

(52) U.S. Cl.
CPC ............... *F16K 2099/008* (2013.01); *F16K 2099/0084* (2013.01); *Y10T 436/2575* (2015.01)

(56) References Cited

U.S. PATENT DOCUMENTS

| | | |
|---|---|---|
| 8,795,607 B2 | 8/2014 | Kurowski et al. |
| 8,821,814 B2 | 9/2014 | Cho et al. |
| 8,950,424 B2 | 2/2015 | Weber et al. |
| 9,044,752 B2 | 6/2015 | Wimberger-Friedl et al. |
| 9,110,044 B2 | 8/2015 | Gumbrecht et al. |
| 9,151,409 B2 | 10/2015 | Friedrich et al. |
| 9,283,562 B2 | 3/2016 | Takahashi et al. |
| 9,579,653 B2 | 2/2017 | Takahashi et al. |
| 9,630,177 B2 | 4/2017 | Stern et al. |
| 9,657,341 B2 | 5/2017 | Park et al. |
| 10,518,262 B2 | 12/2019 | Sprague et al. |
| 10,682,644 B2* | 6/2020 | Schmolke ........... F16K 99/0015 |
| 10,767,225 B2* | 9/2020 | Wunderle ........... F16K 99/0034 |
| 2008/0219889 A1 | 9/2008 | Schaefer et al. |
| 2009/0023201 A1 | 1/2009 | Hongo et al. |
| 2012/0298233 A1 | 11/2012 | Rothacher |
| 2013/0156658 A1 | 6/2013 | Shim et al. |
| 2013/0263940 A1* | 10/2013 | Weber ................. B01L 7/52 137/340 |
| 2014/0138260 A1 | 5/2014 | Briman |
| 2014/0329301 A1 | 11/2014 | Handique |
| 2015/0258544 A1* | 9/2015 | Stern ................. F16K 99/0059 506/6 |
| 2016/0167050 A1* | 6/2016 | Taylor ................ F16K 99/0015 422/502 |
| 2017/0002399 A1* | 1/2017 | Eberhart ............. C12Q 1/6806 |

\* cited by examiner

CARTRIDGE, ANALYSIS SYSTEM AND METHOD FOR TESTING A SAMPLE

CROSS-REFERENCE TO RELATED APPLICATIONS

The present application is a Divisional of U.S. patent application Ser. No. 15/725,358 filed Oct. 5, 2017, now U.S. Pat. No. 10,682,644, which claims the benefit of priority to European Patent Application No. EP 16 020 386.5 filed Oct. 7, 2016, the contents of which are incorporated herein by reference in their entirety.

BACKGROUND OF THE INVENTION

Field of the Invention

The present invention relates to a cartridge for analyzing and/or testing an in particular biological sample, to an analysis system for analyzing and/or testing, in particular, a biological sample, and to a method for analyzing and/or testing, in particular, a biological sample as described herein.

Preferably, the present invention deals with analyzing and testing a sample, in particular from a human or animal, particularly preferably for analytics and diagnostics, for example with regard to the presence of diseases and/or pathogens and/or for determining blood counts, antibodies, hormones, steroids or the like. Therefore, the present invention is in particular within the field of bioanalytics. A food sample, environmental sample or another sample may optionally also be tested, in particular for environmental analytics or food safety and/or for detecting other substances.

Preferably, at least one analyte (target analyte) of a sample can be determined, identified or detected by means of the cartridge. In particular, the sample can be tested for qualitatively or quantitatively determining at least one analyte, for example in order for it to be possible to detect or identify a disease and/or pathogen.

Within the meaning of the present invention, analytes are in particular nucleic-acid sequences, in particular DNA sequences and/or RNA sequences, or proteins, in particular antigens and/or antibodies. In particular, by means of the present invention, nucleic-acid sequences can be determined, identified or detected as analytes of a sample, or proteins can be determined, identified or detected as analytes of the sample. More particularly preferably, the present invention deals with systems, devices and other—shape apparatus for carrying out a nucleic-acid assay for detecting or identifying a nucleic-acid sequence or a protein assay for detecting or identifying a protein.

The present invention deals in particular with what are known as point-of-care systems, i.e. those with the option of carrying out tests on site and/or independently from a central laboratory or the like. Preferably, point-of-care systems can be operated autonomously and/or independently of a mains network for supplying electrical power.

Description of Related Art

U.S. Pat. No. 5,096,669 discloses a point-of-care system for testing a biological sample, in particular a blood sample. The system comprises a single-use cartridge and an analysis device. The cartridge comprises a receptacle for the sample, it being possible for the receptacle to be closed by a cap once the sample has been received. The cartridge is then inserted into the analysis device in order to carry out the test. The cartridge comprises a microfluidic system and a sensor apparatus comprising electrodes, which apparatus is calibrated by means of a calibration liquid and is then used to test the sample. A waste cavity for receiving liquids is fluidically connected to the sensor apparatus.

Furthermore, International Patent Application Publication WO 2006/125767 A1 and corresponding U.S. Pat. No. 9,110,044 disclose a point-of-care system for integrated and automated DNA or protein analysis, comprising a single-use cartridge, an analysis device comprising a control device and comprising means for receiving and processing signals, the control device being designed to fully automatically process and evaluate molecular-diagnostic analyses using the single-use cartridge.

Valves arranged on or in the cartridge are used to control the flow rate or fluid flow of the sample and/or another fluid in point-of-care systems of this type. These valves may for example be arranged upstream and/or downstream of a measuring or metering cavity, mixing cavity, treatment or reaction cavity and/or sensor apparatus of the cartridge, in particular in order to control and/or influence the reactions and/or measurements as desired.

For example, International Patent Application Publication WO 2010/136298 A1 discloses a method for controlling an instrument comprising an array of valves that each control a fluid flow in an associated flow channel. The valves are each actuated by applying a compressive force, exerted in particular by at least one actuator, a valve being open and it being possible for a fluid to flow in an associated flow channel when no compressive force is applied, and the valve being closed and the fluid flow being stopped in the associated flow channel when compressive force is applied to the valve.

International Patent Application Publication WO 97/47967 A1 and corresponding U.S. Pat. No. 5,863,801 disclose a device for performing a method for the automated isolation of nucleic acids from a biological sample. The device comprises a removable cassette for the sample having a plurality of channels and valves which can be actuated from opposing sides of the cassette.

International Patent Application Publication WO 2015/138696 A1 discloses a microfluidic device for sample preparation and/or analysis having a plurality of channels and valves. The valves are formed by a flexible membrane which is arranged between two outer layers of the microfluidic device. Actuation of the valves from opposed sides of the device is possible.

U.S. Patent Application Publication 2009/0023201 A1 discloses a cassette and apparatus for detecting nucleic acids. The cassette comprises a plurality of channels and valves. The valves can be actuated from opposed sides of the cassette.

European Patent Application EP 2 657 708 A1 discloses a microchip for analyzing a sample, the microchip having a plurality of channels and valves. The valves can have deformable walls which are deformed for opening and closing.

SUMMARY OF THE INVENTION

The problem addressed by the present invention is to provide an improved cartridge, an improved analysis system and an improved method for testing and/or analyzing an in particular biological sample, a compact and/or cost-effective construction or design, reliable, gentle, hygienic and/or simple testing of the sample and/or improved control of the fluid flow preferably being made possible or facilitated.

The above problem is solved by cartridges, an analysis system, and methods as described herein.

One aspect of the present invention is that at least one valve and/or a first group having one or more valves and at least one other valve and/or a second group having one or more valves can be or are actuated from different sides of the cartridge and/or in different or at least substantially opposing actuation directions. This allows or facilitates a particularly compact construction or design of the cartridge and/or of an analysis device comprising actuators for actuating valves. Furthermore, the load and/or the pressure on the cartridge is distributed between the two sides of the cartridge as a result of the valves being actuated opposingly, and therefore an altogether optimized and/or better distribution of the forces acting on the cartridge is made possible, and the risk of damage to the cartridge and/or the requirements for the mechanical strength of the cartridge is/are reduced.

Preferably, the first group and the second group and/or all of the valves of the cartridge are arranged on a common side of the cartridge, in particular either on the front or on the back of the cartridge, the first group preferably being or being able to be actuated from the front of the cartridge and the second group preferably being or being able to be actuated from the back of the cartridge.

Preferably, some or all of the valves comprise a wall or film that is flexible and/or elastically deformable at least in part, and/or some or all of the valves can be actuated, in particular closed and/or opened, by said wall or film being elastically deformed.

In particular, the valves and/or the first and/or second group can be opened and/or closed by being mechanically actuated, at least one valve of the valves or the first and/or second group preferably being designed to automatically close again after being opened and/or to automatically open again after being closed. This allows or facilitates a particularly simple, reliable and/or hygienic actuation of the valves and/or groups.

The term "cartridge" is preferably understood to mean a structural apparatus or unit designed to receive, to store, to physically, chemically and/or biologically treat and/or to measure a preferably biological sample. A cartridge within the meaning of the present invention preferably comprises a fluidic system or fluid system having a plurality of channels, cavities and/or valves for controlling the flow through the channels and/or cavities. In particular, within the meaning of the present invention, a cartridge is designed to be at least substantially planar, flat and/or card-shape, in particular is designed as a fluidic card and/or is designed as a support and/or container for the sample that can be inserted and/or plugged into the proposed analysis device.

The proposed analysis system preferably comprises an analysis device and at least one proposed cartridge for the sample. In particular, the analysis system is designed as a kit comprising the analysis device and/or at least one proposed cartridge.

A kit within the meaning of the present invention is preferably a group comprising the analysis device and/or at least one cartridge. The analysis device and/or the cartridge preferably each form a component of the kit.

The components of the kit are preferably marketed as a group, in particular in the same packaging or the like. It is however also possible for the aforementioned components to form a group of separate components for joint use. A common or unifying component is preferably provided, for example common operating instructions, recommendations for use or references on the labelling of one or more of the components of the kit and/or the common packaging. The proposed analysis system or kit optionally comprises at least a pair of gloves, operating instructions, a transfer apparatus such as a syringe, pipette or the like, and/or an extractant or solvent.

The term "analysis device" is preferably understood to mean a structural apparatus designed to chemically, biologically and/or physically test and/or analyze a sample or analysis sample or a component thereof, in particular in order for it to be possible to directly and/or indirectly detect or identify a disease and/or pathogen. An analysis device within the meaning of the present invention is in particular a portable or mobile device designed in particular to directly test and/or analyze the sample, in particular on site and/or in the vicinity of the sampling site and/or away from a central laboratory.

Another aspect of the present invention, which can also be implemented independently, involves an analysis device, in particular as part of an analysis system, for receiving a cartridge, the analysis device comprising a plurality of actuators or actuation apparatus for actuating the valves, and it being possible for the cartridge to be arranged or received between at least two actuators or actuation apparatus, preferably such that the valves are or can be actuated by means of the actuators or actuation—shape, apparatus from different sides of the cartridge and/or in different, in particular at least substantially opposing, actuation directions. This results in corresponding advantages. In particular, a construction of this kind allows or facilitates an improved use of installation space.

According to another aspect of the present invention, which can also be implemented independently, a first actuator of the actuators is designed to actuate and/or open at least one valve or the first group having one or more valves from a first side of the cartridge, in particular the front or a flat side of the cartridge, and a second actuator of the actuators is designed to actuate and/or close at least one other valve or the second group having one or more valves from a second side of the cartridge, in particular the back or an opposing flat side of the cartridge. This results in corresponding advantages.

The proposed method for testing and/or analyzing an in particular biological sample is characterized in that at least one valve or a first group having one or more valves and at least one other valve or a second group having one or more valves are actuated, in particular opened and/or closed, from different, preferably opposing, sides of the cartridge and/or in different, preferably opposing, actuation directions.

The mentioned aspects and features of the present invention and the aspects and features of the present invention that will become apparent from the following description can in principle be implemented independently from one another, but also in any combination.

Other aspects, advantages, features and properties of the present invention will become apparent from the following description of a preferred embodiment with reference to the accompanying drawings.

DETAILED DESCRIPTION OF THE INVENTION

In the following description, the same reference signs are used for the same and similar parts and components, resulting in corresponding properties and features even if these are not repeatedly described.

Figure 1:
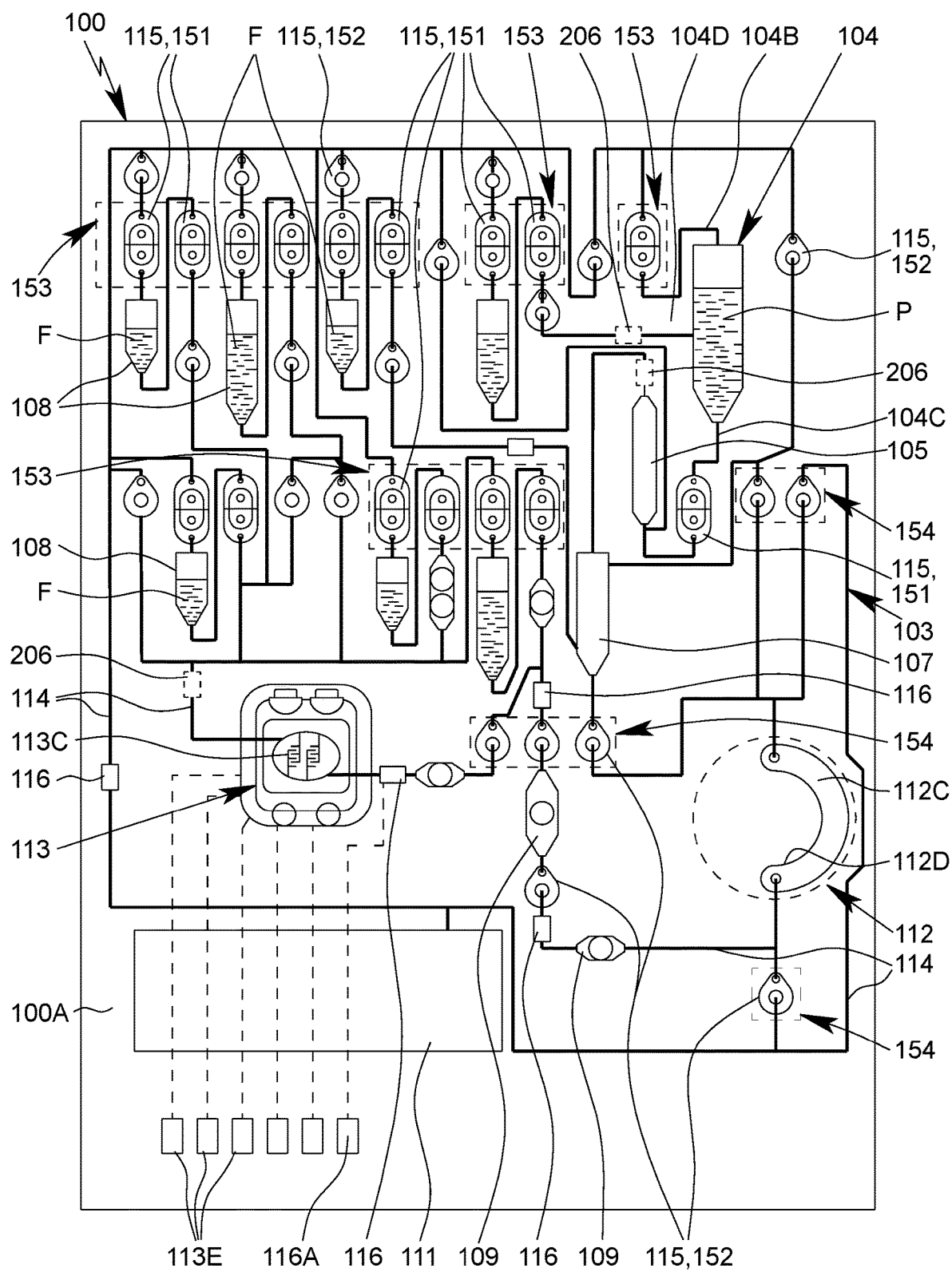
FIG. 1 is a schematic plan view of a proposed cartridge.

FIG. 1 is a highly schematic view of a preferred embodiment of a proposed cartridge 100 for testing, in particular, a biological sample P.

The term "sample" is preferably understood to mean the sample material to be tested, which is in particular taken from a human or animal. In particular, within the meaning of the present invention, a sample is a fluid, such as saliva, blood, urine or another liquid, preferably from a human or animal, or a component thereof. Within the meaning of the present invention, a sample may be pretreated or prepared if necessary, or may come directly from a human or animal or the like, for example. A food sample, environmental sample or another sample may optionally also be tested, in particular for environmental analytics, food safety and/or for detecting other substances, preferably natural substances, but also biological or chemical warfare agents, poisons or the like.

A sample within the meaning of the present invention preferably contains one or more analytes, it preferably being possible for the analytes to be identified or detected, in particular qualitatively and/or quantitatively determined. Particularly preferably, within the meaning of the present invention, a sample has target nucleic-acid sequences as the analytes, in particular target DNA sequences and/or target RNA sequences, and/or target proteins as the analytes, in particular target antigens and/or target antibodies. Particularly preferably, at least one disease and/or pathogen can be detected or identified in the sample P by qualitatively and/or quantitatively determining the analytes.

The cartridge 100 comprises a receptacle or receiving cavity 104 for the sample P. Further details will be given later on a preferred construction of this receptacle or receiving cavity 104.

The cartridge 100 comprises a fluidic, preferably microfluidic, system 103, referred to in the following as the fluid system 103, which is fluidically connected to the receptacle or receiving cavity 104.

The cartridge 100 and/or the fluid system 103 preferably comprises at least one pump apparatus 112, at least one storage cavity 108 for a reagent, in the example shown in particular a plurality of storage cavities 108 for different liquid reagents F, at least one measuring or metering cavity 105, at least one mixing cavity 107, at least one treatment or reaction cavity 109, a collection or equalization cavity 111 and/or at least one sensor apparatus 113.

The cartridge 100 and/or the fluid system 103 in particular comprises channels 114, valves 115 and/or sensors or sensor portions 116.

Particularly preferably, the fluid system 103 is formed by the cavities 105, 107 to 109, 111 and the channels 114.

The channels 114 are preferably designed to fluidically interconnect the receptacle or receiving cavity 104, the pump apparatus 112, the cavities 105, 107 to 109, 111 and/or the sensor apparatus 113 and/or to connect these as desired and/or selectively.

The valves 115 are preferably designed to control, in particular, to allow, to prevent, to reduce and/or to increase, preferably temporarily or permanently as desired, the flow rate or fluid flows, in particular of the sample P and/or of the reagent F or reagents F and/or of gas or air, through the channels 114, cavities 105, 107 to 109, 111, the pump apparatus 112, the sensor apparatus 113 and/or the sensors or sensor portions 116, as explained in greater detail in the following.

The cartridge 100 preferably comprises an in particular at least substantially planar, flat, plate-shaped and/or card-shape support or main body 101, the support or main body 101 preferably being made of and/or injection-molded from plastics material.

Preferably, the cavities 105, 107 to 109, 111, the channels 114, the valves 115 and/or the pump apparatus 112 are formed by corresponding depressions and/or raised portions in the support or main body 101.

More particularly preferably, the cartridge 100 comprises a film or cover 102, the support or main body 101 preferably being connected at least in part to the film and/or cover 102, in particular in a bonded manner, and/or being covered at least in part by the film and/or cover 102, preferably in a gas-tight manner.

In particular, the depressions in the support or main body 101 are covered and/or closed by the film and/or cover 102, and/or the raised portions are formed by the film and/or cover 102 and/or a (local) bulge of the film and/or cover 102.

Figure 2:
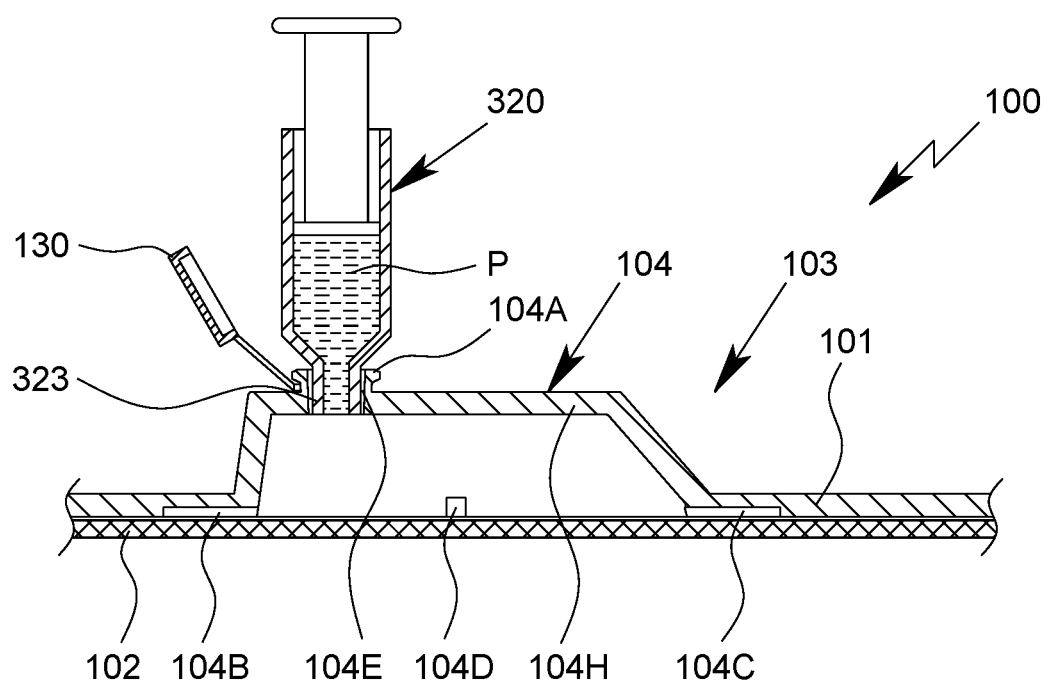
FIG. 2 is a schematic section through the cartridge in the region of a receptacle or receiving cavity for a sample in the open state, with a transfer apparatus connected.
Figure 5:
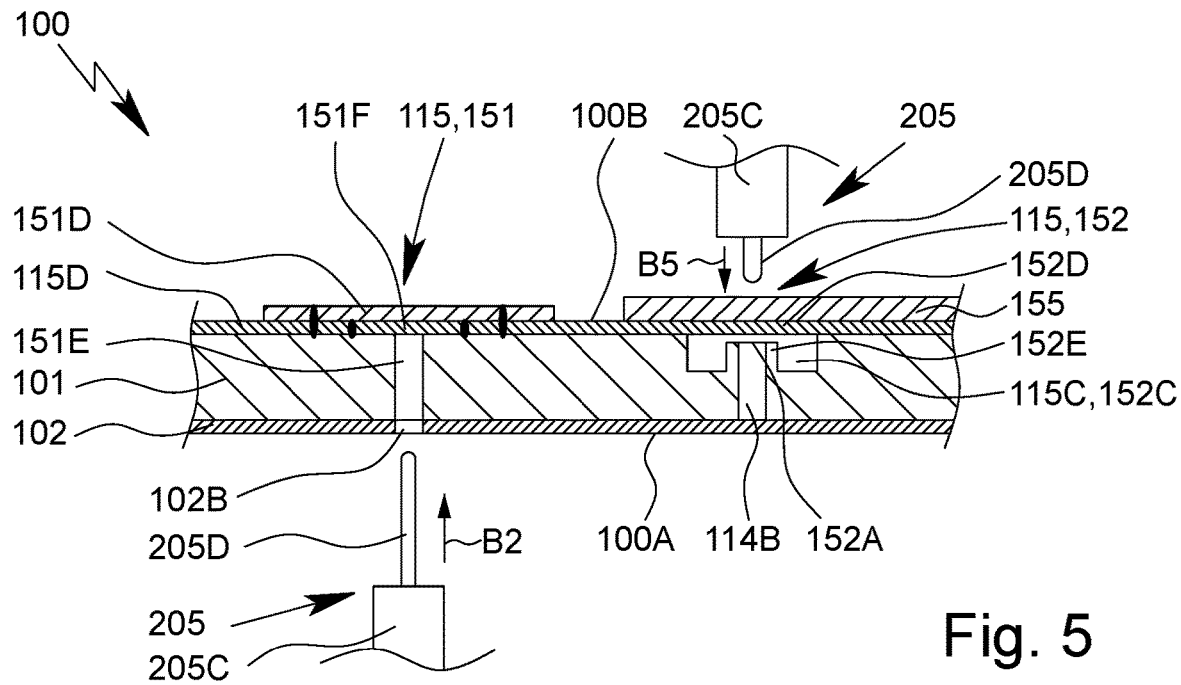
FIG. 5 is a schematic section through the cartridge along the sectional line V-V according to FIG. 4.
Figure 6:
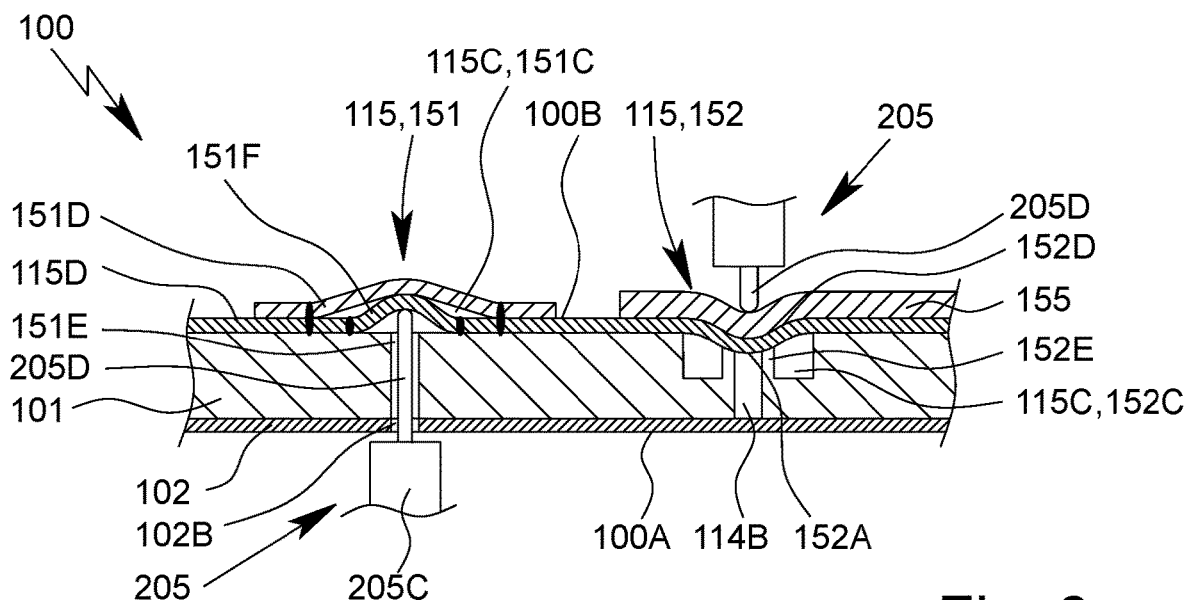
FIG. 6 is a schematic section through the cartridge according to FIG. 5 when actuated.

Particularly preferably, the cavities 105, 107 to 109, 111, the channels 114, the valves 115 and/or the pump apparatus 112 and/or the walls thereof are formed by the depressions and/or raised portions in or on the support or main body 101 and by the film and/or cover 102, as shown schematically in FIG. 2 for the channels 104B, 104C and 104D, and in FIGS. 5 and 6 for the pump apparatus 112. However, other structural solutions are also possible.

FIG. 2 is a highly schematic partial section through the cartridge 100 in the region of the receptacle or receiving cavity 104.

Preferably, the cartridge 100, in particular the support or main body 101, comprises a depression 104H, in particular forming the receiving cavity 104, which is covered by the film and/or cover 102 in this case. Additionally, or alternatively, the film and/or cover 102 forms the receiving cavity 104 and/or depression 104H, preferably so as to be raised from the support or main body 101 or the surface thereof.

The receptacle or receiving cavity 104 preferably comprises a connection 104A for receiving the sample P. In particular, a transfer apparatus 320, in this case preferably comprising a connection 323, in particular a connecting tip, can be connected to the receptacle or receiving cavity 104 or the connection 104A thereof, as shown schematically in FIG. 2, in order to fill the receptacle or receiving cavity 104 with the sample P.

The transfer apparatus 320 may for example be a syringe, a pipette, a tube or the like.

FIG. 2 shows the receptacle or receiving cavity 104 when still empty, i.e. before receiving the sample P.

Once the sample P has been received, the receptacle or receiving cavity 104 can preferably be closed fluidically and in particular also in a gas-tight manner. In the example shown, the receptacle or receiving cavity 104 preferably comprises a closure element 130 for this purpose, which in this case is designed in particular as a latched, screwed or hinged lid.

Once the sample P has been received, the transfer apparatus 320 is removed from the receptacle or receiving cavity 104 or the connection 104A and the receptacle or receiving cavity 104 or the connection 104A thereof is closed by the closure element 130.

The fluid system 103 is preferably connected to the receptacle or receiving cavity 104 and/or the depression 104H by means of a connection channel or outlet 104C for receiving and/or discharging the sample P, as shown schematically in FIGS. 1 and 2, the fluid system 103 being shown only in part in FIG. 2.

Furthermore, the fluid system 103 is preferably connected to the receptacle or receiving cavity 104 or the depression 104H thereof via a ventilation channel or inlet 104B and/or flushing channel or intermediate connection 104D, such that the sample P or at least a component thereof can be conveyed out of the receptacle or receiving cavity 104 or depression 104H, in particular via the channel or outlet 104C, in particular without a (relevant) vacuum developing in the receptacle or receiving cavity 104.

If required, a gas or air can be fed to the receptacle or receiving cavity 104 via the ventilation channel or inlet 104B and/or a liquid, for example a reagent F, can be fed to said receptacle or receiving cavity 104 via the flushing channel or intermediate connection 104D, in order to convey the sample P or a component thereof into the fluid system 103, the channel or outlet 104C and/or a downstream cavity 105, 107, 109 and/or into the sensor apparatus 113.

The sample P or a component thereof is conveyed out of the receptacle or receiving cavity 104 into the fluid system 103 preferably by suction and/or by overpressure (feeding gas and/or liquid into the receptacle or receiving cavity 104). This is in particular facilitated or made possible by locking, sealing and/or closing the receptacle or receiving cavity 104 and/or the fluid system 103, preferably in a gas-tight manner.

The sample P or a component thereof is particularly preferably conveyed by means of the pump apparatus 112 and/or by accordingly controlling the valves 115.

Preferably, the pump apparatus 112 comprises at least one pump chamber 112C and/or the pump apparatus 112 is formed by at least one pump chamber 112C, as shown in FIG. 1.

Figure 3:
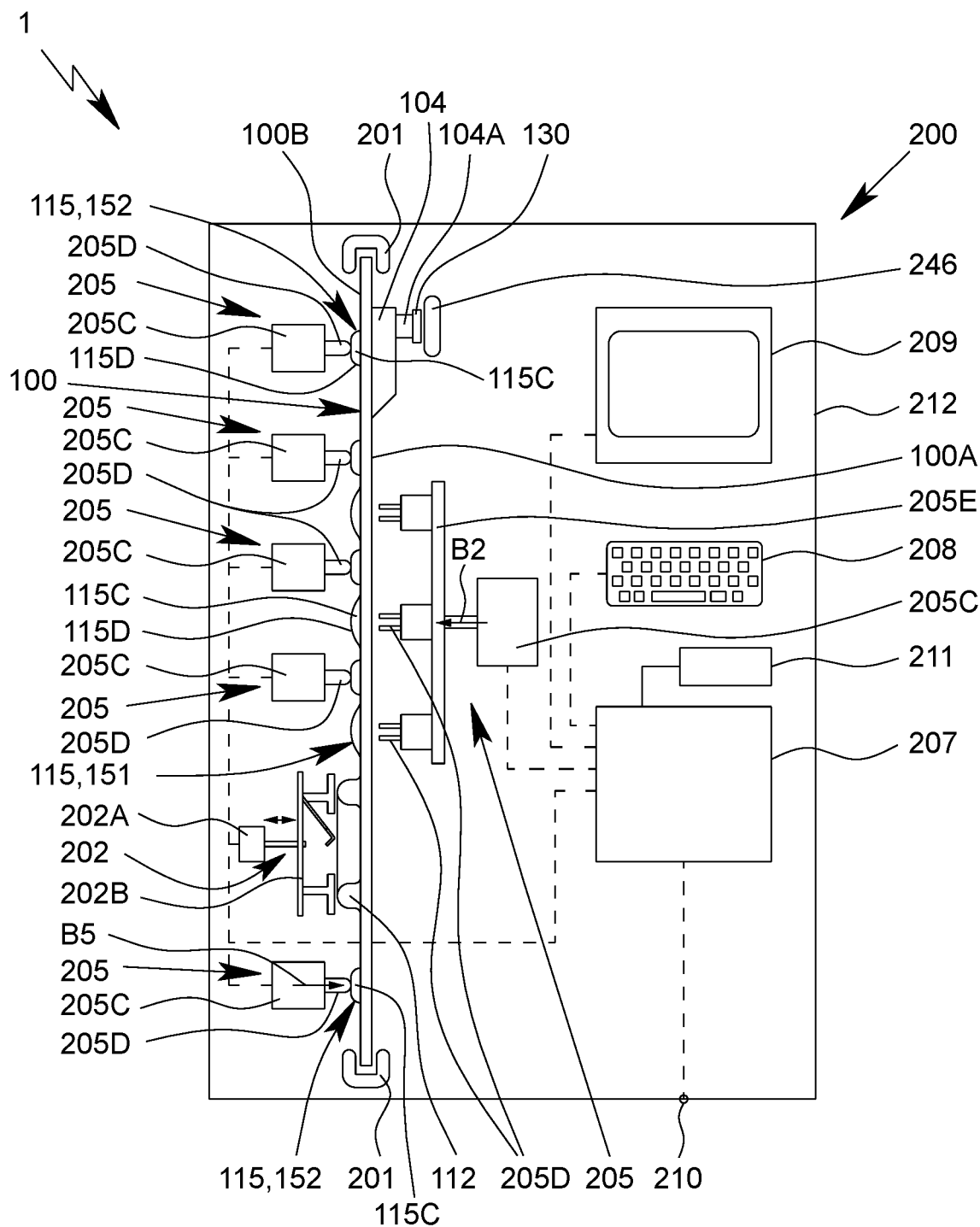
FIG. 3 is a schematic view of a proposed analysis system comprising the cartridge according to FIG. 1 and a proposed analysis device.

The pump chamber 112C is preferably designed as a raised portion and/or depression on or in the cartridge 100, in particular the support or main body 101, as shown in particular in FIGS. 3, 5 and 6.

Preferably, the pump apparatus 112 and/or the pump chamber 112C comprises a wall 112D that is flexible and/or elastically deformable at least in part, the wall 112D in particular being formed by a film, for example the film and/or cover 102.

Preferably, the pump apparatus 112 and/or the pump chamber 112C is elastically deformable, in particular compressible, at least in part and/or in portions. In particular, the wall 112D can be pressed onto the support or main body 101 or the surface thereof, the wall 112D and/or the pump chamber 112C then preferably being automatically reset and/or enlarged again, for example, by a compressive force and/or by a restoring or deflecting apparatus (not shown).

The pump chamber 112C preferably has and/or defines a volume, in particular a pump volume, for a fluid, in particular the sample P and/or the reagent F, it preferably being possible for the volume to be changed, in particular to be reduced at least temporarily.

Particularly preferably, a fluid, in particular the sample P and/or the reagent F and/or a gas, can be conveyed through the pump chamber 112C, in particular by temporarily changing the pump volume of the pump chamber 112C and/or by deforming, in particular compressing, the pump chamber 112C, the wall 112D and/or the film or cover 102 in portions and/or temporarily.

In the embodiment shown, the cartridge 100 comprises just one pump apparatus 112, the pump apparatus 112 preferably making it possible, depending on the valves 115, to convey the fluid, in particular the sample P and/or the reagent F, through all the cavities 105, 107 to 109 and 111, channels 114 and valves 115. However, other structural solutions are also possible in which the cartridge 100 comprises a plurality of pump apparatus 112 and/or pump chambers 112C.

Once the receptacle or receiving cavity 104 has been closed, the fluid system 103 forms, in particular together with the receptacle or receiving cavity 104 and/or the connected cavities 105, 107 to 109 and 111, channels 114, the pump apparatus 112 or pump chamber 112C and/or the sensor apparatus 113, a closed circuit for fluids, in particular gas, air and/or liquids. This is facilitated or made possible by the receptacle or receiving cavity 104 and/or the fluid system 103 being locked, sealed and/or closed, preferably in a gas-tight manner.

The sensor apparatus 113 is designed in particular for electrochemically measuring the prepared sample P. In particular, the sensor apparatus 113 comprises a corresponding biochip or functionalized chip or the like.

The sensor apparatus 113 in particular comprises electrodes 113C that particularly preferably engage in one another in a finger-shape manner and/or form a plurality of electrode pairs and/or measurement points. Particularly preferably, the sensor apparatus 113 and/or the chip is constructed as described in U.S. Pat. No. 7,123,029 B2 or U.S. Pat. No. 7,914,655 B2.

The sensor apparatus 113 preferably operates electrically and/or electrochemically. In particular, the cartridge 100 and/or the support or main body 101 comprises electrical contacts 113E for electrically connecting the sensor apparatus 113, as shown schematically in FIG. 1.

As already explained, the cartridge 100 and/or the fluid system 103 preferably comprises one or more sensors or sensor portions 116, in particular for detecting a flow front and/or for detecting the presence of a liquid, for measuring the pH or another value, measuring the temperature or the like.

Preferably, the cartridge 100 and/or the support or main body 101 comprises corresponding electrical contacts 116A for electrically connecting the sensors or sensor portions 116, just one electrical contact 116A for electrically contacting or connecting an assigned sensor or sensor portion 116 being schematically shown in the view according to FIG. 1 for reasons of simplicity.

As an alternative or in addition to the sensors or sensor portions 116, one or more sensors 206 may also be provided that are in particular used for detecting a flow front and/or for detecting the presence of a liquid, or for measuring the temperature or other values or the like, the sensors 206 preferably not forming part of the cartridge 100, but instead being arranged on or in an assigned analysis device 200, as explained in greater detail in the following.

FIG. 3 shows a proposed analysis system or kit 1 comprising the proposed analysis device 200 and the proposed cartridge 100.

Preferably, the analysis device 200 and the assigned cartridge 100 form the proposed analysis system or kit 1 for testing an in particular biological sample P.

The cartridge 100 can preferably be connected to the analysis device 200 and/or can be received by the analysis device 200 at least in part. Particularly preferably, the cartridge 100 can be plugged into the analysis device 200. However, other structural solutions are also possible.

FIG. 3 shows the analysis system 1 in the ready-to-use state for carrying out a test on the sample P received in the cartridge 100. In this state, the cartridge 100 is therefore linked to, received by or plugged into the analysis device 200.

The view in FIG. 3 is merely schematic, in order to illustrate essential functions and/or aspects.

In the example shown, the analysis device 200 preferably comprises a mount or receptacle 201, such as a slot or the like, for receiving and/or mounting the cartridge 100. However, other structural solutions are also possible.

Preferably, the cartridge 100 is fluidically, in particular hydraulically, separated or isolated from the analysis device 200. In particular, the cartridge 100 forms, together with the receptacle or receiving cavity 104, a preferably independent and in particular closed fluidic and/or hydraulic system and/or fluid system 103 for the sample P.

Preferably, the cartridge 100 is merely electrically connected to the analysis device 200. However, in principle or in addition, an optical, mechanical, thermal and/or pneumatic coupling is also possible or provided, in particular for measurement purposes.

The test and/or the test sequence in the cartridge 100 is preferably controlled electrically, thermally and/or mechanically and/or the effect of the analysis device 200 on the cartridge 100 is preferably electrical, thermal and/or mechanical.

Preferably, the pump apparatus 112, pump chamber 112C and/or valves 115 are actuated mechanically by the analysis device 200.

Particularly preferably, the analysis device 200 only has a mechanical effect on the cartridge 100, in particular the pump apparatus 112, pump chamber 112C and/or valves 115, in particular in order to make possible or bring about the desired preparation and/or treatment and testing of the sample P in the cartridge 100 and/or the analysis device 200.

In addition, if required, the analysis device 200 may also have a thermal effect on the cartridge 100 and/or the test sequence and/or the sample P, i.e. for example may temperature-control a treatment or reaction cavity 109 in a desired manner, it also being possible in particular for thermal cycles to be run in order for it to be possible to, for example, carry out a PCR (polymerase chain reaction) in the cartridge 100.

Additionally, or alternatively, if required, the cartridge 100 may also comprise a temperature-control or heat-generation apparatus, such as a heating element, thermal element, thermocouple or the like, which can in particular be electrically supplied and/or controlled by the analysis device 200.

The analysis device 200 preferably comprises a pump drive 202, the pump drive 202 in particular being designed for mechanically actuating the pump apparatus 112 and/or pump chamber 112C on or in the cartridge 100.

Preferably, the pump apparatus 112 can be driven by means of the pump drive 202, in particular from the outside. In particular, the pump drive 202 is designed to interact with the pump apparatus 112 and/or pump chamber 112C such that the sample P, the reagent F and/or another fluid or gas can be conveyed and/or pumped within the cartridge 100 and/or the analysis device 200.

Preferably, the pump drive 202 is fluidically, in particular hydraulically, separated from the pump apparatus 112 and/or pump chamber 112C, in particular by means of the wall 112D of the pump apparatus 112.

Preferably, the pump drive 202 of the analysis device 200 and the pump apparatus 112 and/or pump chamber 112C of the cartridge 100 together form a pump, in particular a hose pump or peristaltic pump, it preferably being possible for the sample P, the reagent F and/or another fluid to be conveyed, pumped and/or pressurized within the pump apparatus 112 and/or pump chamber 112C by externally mechanically deforming the pump chamber 112C and/or the wall 112D.

For example, the pump may be constructed as described in DE 10 2011 015 184 B4 and corresponding U.S. Pat. No. 8,950,424. However, other structural solutions are also possible.

The pump drive 202 preferably comprises an in particular electrical drive and/or motor 202A and a pump head 202B, it preferably being possible for the pump head 202B to be driven by means of the motor 202A, preferably in a rotary or linear manner.

Preferably, the cartridge 100 can be moved, in particular displaced or pressed, relative to the pump drive 202, in particular the pump head 202B, and/or towards the pump drive 202, in particular the pump head 202B, or vice versa, in particular in order to drive and/or actuate the pump apparatus 112.

The pump drive 202 and the pump apparatus 112 can be interconnected and disconnected from one another as desired, preferably by displacing or moving the cartridge 100 relative to the pump drive 202 and/or pump head 202B, or vice versa.

The cartridge 100 preferably comprises a plurality of valves 115, as shown in FIG. 1 and FIG. 3. Preferably, the cartridge 100 comprises more than two or ten, particularly more than 15 or 20, in particular more than 30 or 40, and/or fewer than 100 or 90, particularly preferably fewer than 80 or 70, in particular fewer than 60, valves 115.

According to the invention, the valves 115 of the cartridge 100 can be actuated, in particular opened and/or closed, from different sides and/or flat sides 100A, 100B of the cartridge 100, as shown in particular in FIG. 3.

Preferably, at least one valve 115 of the valves 115 can be actuated, in particular opened and/or closed, from the front 100A of the cartridge 100 and at least one other valve 115 of the valves 115 can be actuated, in particular opened and/or closed, from the back 100B of the cartridge 100.

The front 100A and the back 100B of the cartridge 100 are preferably each a flat side of the in particular planar and/or card-shape cartridge 100.

Preferably, the front 100A of the cartridge 100 is at least substantially flat or planar and/or is an at least substantially flat or planar side of the cartridge 100. In particular, the front 100A comprises the film and/or cover 102 or is formed thereby.

Preferably, the back 100B of the cartridge 100 is opposite the front 100A.

The back 100B of the cartridge 100 is preferably uneven and/or is an uneven side of the cartridge 100. In particular, the back 100B is formed by the receptacle or receiving cavity 104, the pump and/or pump chamber 112C and/or cavities 105, 107 to 109, 111 and/or the walls thereof. However, other solutions are also possible in which the back 100B is flat or planar.

Preferably, the valves 115 are or can be divided into two groups. In particular, the valves 115 can be assigned to two different groups of valves 115.

Preferably, the cartridge 100 comprises a first group 153 having one or more valves 115 and a second group 154 having one or more valves 115.

Preferably, the first group 153 and the second group 154 can be actuated from the different sides 100A, 100B of the cartridge 100, as shown in particular in FIG. 3.

Particularly preferably, the first group 153 can be actuated from the front 100A of the cartridge 100 and the second group 154 can be actuated from the back 100B, or vice versa.

Preferably, at least one valve 115 of the valves 115 or the first group 153 can be actuated in a first actuation direction B2 and at least one other valve 115 of the valves 115 or the second group 154 can be actuated in a second actuation direction B5, the first actuation direction B2 preferably being at least substantially opposite the second actuation direction B5.

Preferably, the first actuation direction B2 and/or the second actuation direction B5 is/are at least substantially orthogonal to the front 100A, the back 100B and/or a main plane of extension of the cartridge 100. However, other solutions are also possible here.

Preferably, the valves 115 can be opened by actuation in the first actuation direction B2 and/or can be closed by actuation in the second actuation direction B5, or vice versa.

Preferably, more than two, particularly preferably more than five or ten, valves 115 are or can be assigned to the first group 153 and/or more than two or ten, particularly preferably more than 15 or 20, in particular more than 25 or 30, valves 115 are or can be assigned to the second group 154.

Preferably, a plurality or all of the valves 115 in the first group 153 and/or in the second group 154 are arranged (immediately) next to one another and/or in series and/or can be actuated simultaneously, as explained in greater detail in the following.

In particular, the second group 154 comprises more valves 115 than the first group 153. However, other solutions are also possible here, in particular those in which the groups 153, 154 each comprise the same quantity of valves 115 or the first group 153 comprises more valves 115 than the second group 154.

In the embodiment shown, the first group 153 and the second group 154 and/or all the valves 115 are arranged on the same side, in particular on the front 100A or the back 100B of the cartridge 100.

Optionally, irrespective of the side 100A, 100B on which they are arranged, at least one valve 115 or the first group 153 and/or second group 154 can be actuated from different sides 100A, 100B, in particular can be opened from one of the sides 100A, 100B and closed from the other of the sides 100A, 100B. This is made possible in particular by the construction of the valves 115, as explained in greater detail in the following.

Preferably, some or all of the valves 115 and/or an actuatable film or wall 115D thereof is/are arranged on the back 100B, and/or the film and/or cover 102 is/are arranged on the front 100A of the cartridge 100. In particular, the valves 115 and/or the walls 115D thereof on the one hand and the film and/or cover 102 on the other hand are arranged on different sides 100A, 100B of the cartridge 100.

In an alternative embodiment (not shown), at least one valve 115 of the valves 115 and/or the wall 115D thereof and/or the first group 153 is arranged on the front 100A of the cartridge 100 and at least one other valve 115 and/or the wall 115D thereof and/or the second group 154 is arranged on the back 100B.

The valves 115 are preferably each designed as a raised portion and/or depression on or in the cartridge 100, in particular the support or main body 101.

Preferably, the valves 115 are elastically deformable, in particular compressible and/or expandable, at least in part and/or on one side, preferably in order to actuate said valves.

Preferably, the valves 115 each comprise a wall 115D that is flexible and/or elastically deformable at least in part, the wall 115D in particular being formed by a film, as shown in FIG. 3 to FIG. 9.

Preferably, the wall 115D is arranged on the outside and/or is designed as an in particular continuous layer or film, in particular for some or all of the valves 115, and/or is bonded to the support or main body 101. In particular, the wall 115D is connected, in particular adhered or welded, to the support or main body 101 in a region around the valve 115.

Preferably, the valves 115 can be actuated, in particular opened and/or closed, by elastically deforming the respective walls 115D.

In particular, the wall 115D can be pressed onto or against the support or main body 101 or the surface thereof, or can be pressed into the support or main body 101, preferably in order to close the associated valve 115. This applies in particular to some or all of the valves 115 in the second group 154 and/or the second valve type 152.

Additionally, or alternatively, the wall 115D can be pushed away and/or lifted from the support or main body 101 or the surface thereof, in particular in order to open the valve 115. This applies in particular to some or all of the valves in the first group 153 and/or the first valve type 151.

Preferably, the wall 115D is elastic, resilient and/or flexible such that, once deflected from the unactuated position, and/or once the valve 115 has been actuated and/or once the wall 115D has been deformed, said wall is automatically reset and/or returns to its unactuated position again.

Preferably, the valves 115 each comprise a valve chamber 115C or form such a chamber, the valve chamber 115C preferably being arranged or formed in and/or on the cartridge 100, in particular the support or main body 101.

Preferably, the valve chamber 115C is formed or delimited by the support or main body 101 and the wall 115D.

In particular, the wall 115D covers the valve chamber 115C and/or the wall 115D closes the valve chamber 115C to the outside. This applies in particular to some or all of the valves 115 in the second group 154 and/or the second valve type 152.

Preferably, the wall 115D is connected, preferably bonded, to the support or main body 101, in particular in a non-detachable and/or sealed manner, around the valve chamber 115C.

Preferably, the valve chamber 115C is designed as a raised portion and/or depression on or in the cartridge 100, in particular the support or main body 101, and/or is raised relative to the support or main body 101 or the surface thereof and/or is integrated in said support or surface.

In particular, some or all of the valves 115 can be mechanically actuated, in particular opened and/or closed.

Within the meaning of the present invention, the term "actuate" is preferably understood to mean opening and/or closing the valves 115, in particular actively and/or in a controlled or regulated manner, by mechanical action, in particular from the outside and/or by means of (external) actuators and/or actuation apparatus.

Preferably, an actuated and/or opened valve 115, in particular from the first group 153, allows fluid to flow through the valve 115, an assigned channel 114 and/or an assigned cavity 105, 107 to 109, 111.

Preferably, an actuated and/or closed valve 115, in particular from the second group 154, prevents fluid from flowing through the valve 115, an assigned channel 114 and/or an assigned cavity 105, 107 to 109, 111.

Preferably, the first group 153 or the valves 115 in the first group 153 can be opened by preferably mechanical actuation and/or the second group 154 or the valves 115 in the second group 154 can be closed by preferably mechanical actuation, or vice versa.

Preferably, at least one valve 115 of the valves 115 or the first and/or second group 153, 154 is/are designed to be self-closing or automatically closing and/or self-opening or automatically opening, for example, when a specified pressure is reached or exceeded and/or following mechanical actuation.

Particularly preferably, some or all of the valves 115 in the first group 153 and/or the first group 153 is/are designed to self-actingly or automatically close again after mechanical actuation and/or opening.

Preferably, some or all of the valves 115 in the second group 154 and/or the second group 154 is/are designed to self-open or automatically open again after mechanical actuation or closing.

Particularly preferably, some, a plurality or all of the valves 115 or the group 153 and/or 154 is/are designed to open and/or close (exclusively) upon or by means of mechanical actuation.

Preferably, at least one valve 115 is assigned to the pump apparatus 112 or pump chamber 112C, the storage cavity 108, the measuring or metering cavity 105, the mixing cavity 107, the treatment or reaction cavity 109, the collection cavity 111 and/or the sensor apparatus 113 (respectively), and/or is arranged upstream of, downstream of and/or in the pump apparatus 112 or pump chamber 112C, storage cavity 108, measuring or metering cavity 105, mixing cavity 107, treatment or reaction cavity 109, collection cavity 111 and/or sensor apparatus 113 (respectively), as shown in particular in FIG. 1.

Preferably, a valve 115 is provided at the inlet and/or outlet of the pump apparatus 112 or pump chamber 112C, the storage cavity 108, the measuring or metering cavity 105, the mixing cavity 107, the treatment or reaction cavity 109, the collection cavity 111 and/or sensor apparatus 113, respectively, in particular in order to control, in particular to allow, to prevent, to reduce and/or to increase, the flow of fluid therethrough, permanently or temporarily as desired.

Preferably, a valve 115 of the first group 153 is arranged before or upstream of one of the cavities 105, 107 to 109, 111 (respectively), in particular the storage cavity/cavities 108, and a one valve 115 of the first group 153 is arranged after or downstream of said (respective) cavities, it being possible in particular for the cavity/cavities 105, 107 to 109, 111 to be released and/or for fluid to flow therethrough for the first time by actuating the valves 115 and/or the first group 153, preferably in order to release the reagent or reagents, in particular liquid reagent(s) F, as explained in greater detail in the following.

Preferably, the cavity/cavities 105, 107 to 109, 111, in particular the storage cavity/cavities 108, is/are (respectively) arranged between two valves 115 of the first group 153 and/or is/are fluidically isolated, in particular closed in a gas-tight and/or storage-stable manner, by two valves 115 of the first group 153, at least when the valves 115 and/or the first group 153 is/are unactuated.

Preferably, in each case a valve 115 of the second group 154 is arranged, in particular immediately or directly, in front of or behind the valves 115 of the first group 153 in the flow direction.

In particular, at least one valve 115 of the first group 153 and at least one valve 115 of the second group 154 are connected in series and/or are arranged in succession in the flow direction.

Particularly preferably, the flow can be controlled by means of the second group 154 after and/or despite the first group 153 having been opened, preferably irreversibly. In particular, the cavity/cavities 105, 107 to 109, 111 can be fluidically isolated (again) by closing the second group 154 after and/or despite the first group 153 having been opened.

Preferably, one or more valves 115 of the first group 153 and the second group 154 are actuated simultaneously, in particular such that the reagents in the cavities 105, 107 to 109, 111 assigned to the actuated valves 115 can only be released once the valves 115 of the second group 154 have been opened (again).

In particular, the valves 115 of the first group 153 that are arranged immediately or directly upstream and downstream of one of the cavities 105, 107 to 109, 111 are actuated simultaneously and/or together with those valves 115 of the second group 154 that are arranged immediately upstream and downstream of the same cavity 105, 107 to 109, 111.

The analysis device 200 preferably comprises at least one actuator or actuation apparatus 205, in particular a plurality of actuators or actuation apparatus 205, and/or at least one actuation element 205D, in particular a plurality of actuation elements 205D, as shown in FIG. 3.

Preferably, the actuators, actuation apparatus 205 and/or actuation elements 205D are designed to actuate the valves 115 or the first group 153 and/or second group 154.

Preferably, one actuator 205 and/or actuation element 205D is or can be assigned to each valve 115, respectively. In particular, an actuator 205 and/or actuation element 205D is designed to actuate, in particular to open and/or close, at least one assigned valve 115, respectively.

Alternatively, or additionally, an actuator 205 or an actuation apparatus comprising a plurality of actuation elements 205D can be assigned to a plurality of valves 115 and/or can be designed to (simultaneously) actuate, in particular open and/or close, a plurality of valves 115.

Particularly preferably, a plurality of valves 115, in particular from the first group 153, can be actuated, in particular opened and/or closed, preferably simultaneously, by actuation by means of one assigned actuator 205.

The actuators or actuation apparatus 205 each comprise an optional drive 205C and/or at least one actuation element 205D.

Preferably, the actuators or actuation apparatus 205 assigned to the first group 153 and/or to the valves 115 of the first group 153 each comprise a plurality of, preferably two, actuation elements 205D. In particular, the valves 115 of the first group 153 can each be actuated, in particular opened, by means of two actuation elements 205D of an assigned actuator 205, as explained in greater detail in the following.

Preferably, the actuators 205 assigned to the second group 154 and/or to the valves 115 of the second group 154 each comprise one actuation element 205D. In particular, the valves 115 of the second group 154 can each be actuated, in particular closed, by means of one actuation element 205D of an assigned actuator 205.

The actuators 205 and/or drives 205C are preferably designed as pneumatic, hydraulic or electrical actuators 205 and/or drives 205C.

Preferably, the assigned valves 115 can be actuated by means of the actuation elements 205D.

Preferably, some or all of the actuation elements 205D can be driven or moved by means of the assigned drives 205C, preferably in the first actuation direction B2 and/or the second actuation direction B5.

Particularly preferably, the actuation elements 205D can be moved, in particular displaced, at least substantially orthogonally to the front 100A, back 100B and/or main plane of extension of the cartridge 100.

Additionally, or alternatively, the cartridge 100 can be moved towards one or more actuation elements 205D, preferably in order to actuate one or more valves 115 or some or all of the valves 115 in the first group 153 and/or the second group 154.

As already explained, other structural solutions are in particular also possible in which a plurality of valves 115 can be actuated by means of one actuator 205. Preferably, an actuator 205 of this type comprises a plurality of actuation elements 205D, which are in particular arranged next to one another or in series, one actuation element 205D of the actuator 205 preferably being assigned to one valve 115, respectively.

Preferably, at least one actuator 205 comprises a connection element 205E, such as a rail or the like, the connection element 205E preferably connecting a plurality of actuation elements 205D to the drive 205C and/or the connection element 205E supporting or mounting a plurality of actuation elements 205D, preferably in the manner of a comb, i.e., as a plurality of projecting fingers connected by a crosspiece.

In particular, a plurality of actuation elements 205D are arranged on or at the connection element 205E, as shown in particular in FIG. 3.

In the embodiment shown, one actuator 205, in the example shown the right-hand actuator 205, comprises a plurality of, in this case three, actuation elements 205D, preferably such that a plurality of, in this case three, valves 115 can be simultaneously actuated, in this case preferably opened, by means of the actuator 205. However, other structural solutions are also possible in which more than three, preferably more than five or ten, valves 115 can be (simultaneously) actuated by means of one actuator 205.

According to the invention, the actuators 205 and/or actuation elements 205D are arranged or distributed on different sides 100A, 100B of the cartridge 100.

In particular, at least one actuator 205 of the actuators 205, or a first actuator 205, and/or at least one actuation element 205D is arranged on or faces the front 100A and at least one other actuator 205 of the actuators 205, or a second actuator 205, and/or at least one actuation element 205D is arranged on or faces the back 100B.

Preferably, the first actuator 205 points to or in the direction of the front 100A and the second actuator 205 points to or in the direction of the back 100B.

In particular, at least in the operating state, the cartridge 100 is arranged between at least two of the actuators 205, in particular between the first actuator 205 and the second actuator 205, and/or between at least two actuation elements 205D, preferably in order to actuate the valves 115 from different sides of the cartridge 100.

Preferably, at least one actuator 205 of the actuators 205 or the first actuator 205 is designed to actuate at least one valve 115, the first group 153 and/or one or more valves 115 thereof from a first side and/or from the front 100A of the cartridge 100 and/or in the first actuation direction B2, and at least one other actuator 205 of the actuators 205 or the second actuator 205 is designed to actuate at least one other valve 115, the second group 154 and/or one or more valves 115 thereof from a second side and/or from the back 100B of the cartridge 100 and/or in the second actuation direction B5.

Preferably, some or all of the actuators 205 and/or the actuation elements 205D thereof are moved away from the cartridge 100 in a first position and are pressed onto or against the cartridge 100 or the respective or assigned valves 115 at least in part in a second position.

In particular, the actuators 205 and/or the drives 205C are designed to move the actuation elements 205D and/or the cartridge 100, for example once the cartridge 100 has been received by the analysis device 200, from the first position into the second position, and/or, for example once the test on the sample P is finished or complete, from the second position into the first position.

In particular, at least in the second position, the actuation elements 205D are operatively connected to the assigned valves 115 on an end face and/or on a side remote from the drive 205C, preferably such that said valves 115 are or remain opened and/or closed.

The analysis device 200 is preferably designed to have a mechanical effect on the cartridge 100 by means of the actuators 205 once the cartridge 100 has been received.

In particular, the analysis device 200 is designed to open the cavity/cavities 105, 107 to 109, 111, in particular the storage cavity/cavities 108, and/or to fluidically connect said cavity/cavities to adjacent channels 114 once the cartridge 100 has been received, preferably by actuating or opening the first group 153 and/or one or more valves 115 thereof.

As already explained previously, some or all of the valves 115 or the first group 153 and second group 154 are preferably arranged on the same side of the cartridge 100, in particular either on the front 100A or the back 100B of the cartridge 100.

The valves 115 are preferably arranged on the side 100A, 100B of the cartridge 100 on which the walls 115D of the valves 115 are also arranged. In particular, the walls 115D of the valves 115 or of the first group 153 and second group 154 are arranged on the same side 100A, 100B, preferably on the back 100B of the cartridge 100.

In the following, two preferably different valve types 151, 152 of the valves 115 will be explained in greater detail with reference to FIG. 4 to FIG. 9.

The following aspects and/or those explained in conjunction with FIG. 4 to FIG. 9 may be implemented independently from the preceding aspects and/or those explained in conjunction with FIG. 1 to FIG. 3. In particular, the preceding aspects and/or those explained in conjunction with FIG. 1 to FIG. 3 are not required for implementing the following aspects and/or those explained in conjunction with FIG. 4 to FIG. 9, or vice versa. The aspects relating to the valve types 151, 152 should therefore be considered to be structurally and functionally independent aspects which can be implemented in different, in particular microfluidic, instruments.

Figure 4:
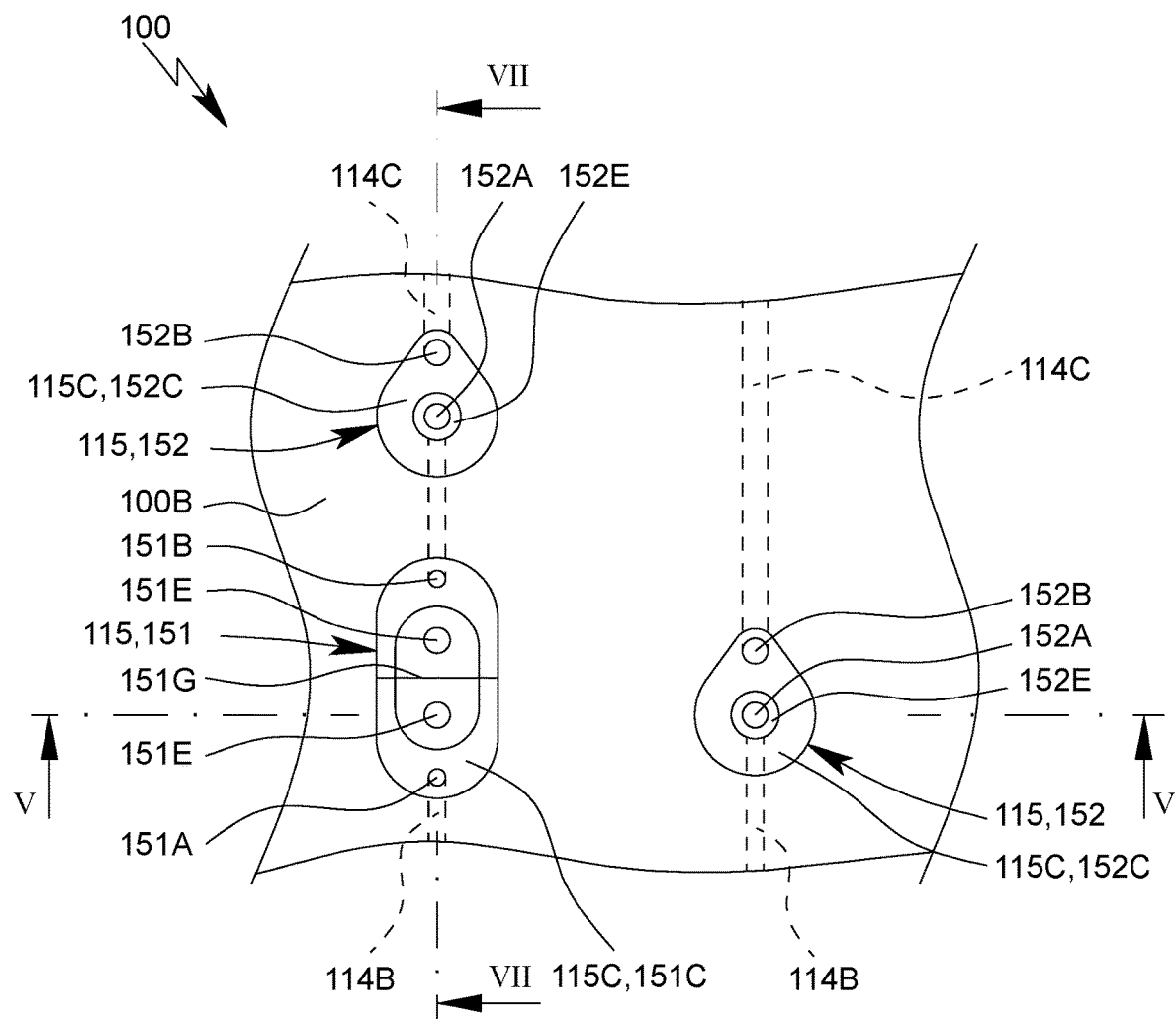
FIG. 4 is a schematic view of a detail of the back of the cartridge according to FIG. 1.

FIG. 4 is a schematic view of the back 100B of the cartridge 100.

The cartridge 100 preferably comprises at least two valve types, in particular a first valve type 151 and a second valve type 152.

In particular, at least one valve 115 or a plurality or all of the valves 115 is/are either designed as a first valve type 151 or as a second valve type 152. However, it is also possible for other valve types to be provided.

Preferably, the valve types 151, 152 have different constructions. However, it is also possible for the valve types 151, 152 to be equivalent or structurally identical.

Preferably, the first valve type 151 and/or the second valve type 152 is/are designed as a membrane valve.

Preferably, some or all of the valves 115 in the first group 153 are designed as the first valve type 151 and/or some or all of the valves 115 in the second group 154 are designed as the second valve type 152, or vice versa. However, it is also possible for the first group 153 to (also) comprise at least one or more valves 115 of the second valve type 152 and/or for the second group 154 to comprise at least one or more valves 115 of the first valve type 151.

The first valve type 151 preferably comprises a wall 151D that is flexible and/or elastically deformable at least in part, the wall 151D in particular being formed by an in particular additional or outer, preferably flexible, resilient or elastic layer or film.

Preferably, the wall 151D is made of and/or injection-molded from plastics material, in particular polypropylene.

The first valve type 151 can preferably be actuated, in particular opened and/or closed, by elastically deforming the wall 151D.

The wall 151D is preferably arranged on the back 100B of the cartridge 100 or wall 115D, particularly preferably is rigidly and/or tightly and/or sealingly connected thereto, for example welded or adhered.

In the embodiment shown, the first valve type 151 is preferably designed as a raised portion on the cartridge 100, in particular the support or main body 101. However, other solutions are also possible here, in particular those in which the first valve type 151 is designed as a depression in the cartridge 100, in particular the support or main body 101. In particular, structural solutions are possible in which the first valve type 151 is integrated in the surface and/or the support or main body 101 of the cartridge 100 such that the first valve type 151, in particular the surface or wall 151D thereof, at least when it is unactuated, and together with the region of the cartridge 100 and/or support or main body 101 directly adjacent to the first valve type 151, is at least substantially flat or planar or is in the same plane.

FIG. 5 is a schematic section through the detail of the cartridge 100 along the sectional line V-V (cf. FIG. 4) when unactuated, and FIG. 6 shows said cartridge when actuated.

Figure 7:
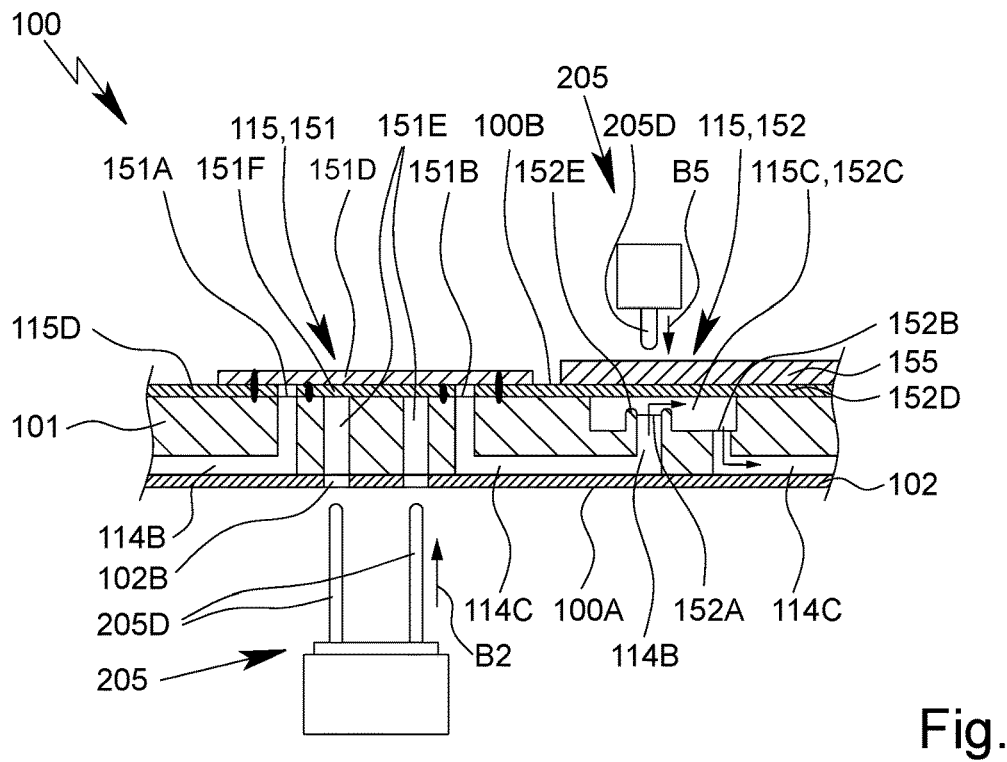
FIG. 7 is a schematic section through the cartridge along the sectional line VII-VII according to FIG. 4.
Figure 8:
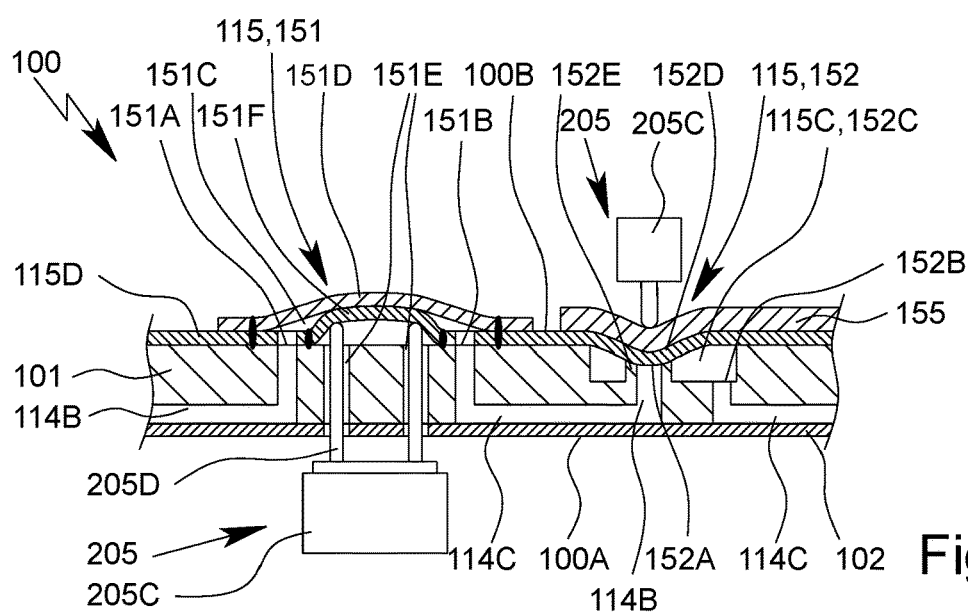
FIG. 8 is a schematic section through the cartridge according to FIG. 7 when actuated.

FIG. 7 is a schematic section through the detail of the cartridge 100 along the sectional line VII-VII (cf. FIG. 4) when unactuated, and FIG. 8 shows said cartridge when actuated.

The first valve type 151 preferably comprises a valve chamber 151C, an inlet opening 151A and/or an outlet opening 151B, the inlet opening 151A preferably being fluidically connected to the outlet opening 151B via the valve chamber 151C and/or both the inlet opening 151A and the outlet opening 151B being arranged within the valve chamber 151C and/or both the inlet channel 114B and the outlet channel 114C discharging into the valve chamber 151C.

Preferably, the first valve type 151 comprises at least one through hole 151E and/or a deflection element 151F, the deflection element 151F preferably being arranged below the wall 151D and/or between the support or main body 101 and the wall 151D.

The deflection element 151F is preferably formed by a flexible or raisable portion in particular of the film and/or wall 115D and/or is designed to deflect and/or elastically deform, in particular expand, the wall 151D by or upon actuation of the first valve type 151.

Particularly preferably, the valve chamber 151C can be opened or enlarged between the walls 115D and 151D by means of the deflection element 151F and/or the inlet opening 151A or inlet channel 114B on the one hand, and the outlet opening 151B or outlet channel 114C on the other hand can be fluidically interconnected, in particular by means of the valve chamber 151C.

The deflection element 151F is preferably formed by the, in particular inner, layer, film or wall 115D and/or is connected to the support or main body 101 and/or the wall 151D, preferably in a bonded manner, particularly preferably by welding, in particular laser welding.

Particularly preferably, the deflection element 151F and/or the wall 115D is connected or welded to the support or main body 101 by means of a weld seam, which preferably extends around the through hole(s) 151E, surrounds or encloses the through hole(s) 151E and/or is an inner weld seam, in particular is connected or welded such that fluid cannot flow out of the valve chamber 151C into the through hole 151E.

Preferably, the wall 151D is connected or welded to the support or main body 101 and/or to the deflection element 151F or the wall 115D by means of a weld seam, which preferably extends around the inlet opening 151A and the outlet opening 151B, surrounds or encloses the inlet opening 151A and the outlet opening 151B and/or is an outer weld seam, in particular is connected or welded such that the valve chamber 151C is sealed to the outside and/or such that a fluid can only flow from the inlet opening 151A to the outlet opening 151B, or vice versa.

More particularly preferably, the deflection element 151F and/or the wall 115D is connected to both the wall 151D and the support or main body 101 by means of the (outer) weld seam, and/or the outer weld seam surrounds or encloses the inner weld seam, as shown in particular in FIG. 4.

Preferably, the deflection element 151F covers the through hole 151E, in particular such that the through hole 151E is fluidically separated from the valve chamber 151C, the inlet opening 151A and/or the outlet opening 151B.

Preferably, an actuation element 205D of an (assigned) actuator 205 can be inserted into the through hole 151E or can be guided through the through hole 151E, preferably from the front 100A to the back 100B of the cartridge 100, or vice versa.

In particular, the deflection element 151F can be raised and/or expanded by inserting an actuation element 205D, preferably such that the first valve type 151 is actuated, in particular opened.

Preferably, the first valve type 151 can be actuated from the front 100A or back 100B as desired.

In particular, the first valve type 151 can be opened from the front 100A, in particular by deflecting and/or raising the deflection element 151F, and/or can be closed from the back 100B, in particular by compressing the wall 151D or by pressing said wall 151D onto or against the deflection element 151F and/or the support or main body 101.

Optionally, the first valve type 151 is designed to be self-closing. Therefore, the first valve type 151 can for example be designed to automatically close again following mechanical actuation, after opening and/or after deflection of the wall 151D, preferably such that the inlet opening 151A is fluidically separated from the outlet opening 151B.

Particularly preferably, when unactuated, as shown in FIG. 5 and FIG. 7, the wall 151D rests on the deflection element 151F and/or the support or main body 101 such that the first valve type 151 is closed.

Preferably, the valve chamber 151C is closed, and/or fluid cannot flow therethrough, when the first valve type 151 is unactuated. Particularly preferably, a fluidic connection between the inlet opening 151A and the outlet opening 151B can (only) be produced by actuating the first valve type 151.

In the embodiment shown, the first valve type 151 is preferably designed as a single-use valve or sealing valve.

In particular, the first valve type 151 is closed before being actuated for the first time, and/or can be irreversibly opened by being actuated for the first time, and/or is irreversibly opened or can no longer be closed after being actuated for the first time. However, other structural solutions are also possible in which the first valve type 151 can be actuated, in particular closed and/or opened, multiple times and/or is designed as a multiple-use valve.

Preferably, the first valve type 151 comprises a seal or separation element 151G, the seal or separation element 151G preferably fluidically separating the inlet opening 151A from the outlet opening 151B and/or dividing the valve chamber 151C into two fluidically separated regions, in particular a first region comprising the inlet opening 151A and a second region comprising the outlet opening 151B.

Particularly preferably, the seal or separation element 151G is designed as an in particular bonded connection and/or weld seam between the wall 151D on the one hand and the support or main body 101 and/or the deflection element 151F on the other hand, and/or is formed by (local) welding/adhesion of the wall 151D to the support or main body 101 and/or the deflection element 151F or wall 115D, the separation element 151G or weld seam preferably extending over the entire width of the first valve type 151 and/or the valve chamber 151C, and/or preferably transversely between the inlet 151A and outlet 151B, as shown in particular in FIG. 4.

In particular, the wall 151D is welded to the support or main body 101 and/or the deflection element 151F between the inlet opening 151A and the outlet opening 151B, in particular such that fluid cannot flow from the inlet opening 151A to the outlet opening 151B, or vice versa, at least when the valve type 151 is unactuated and/or before said valve type 151 is actuated or opened for the first time.

Preferably, the separation element 151G can be (irreversibly) destroyed at least in part by the valve type 151 being actuated (for the first time), and/or the wall 151D on the one hand and the support or main body 101 and/or deflection element 151F on the other hand can be separated from one another at least within the valve chamber 151C by the first valve type 151 being actuated for the first time.

In particular, an uninterrupted fluidic connection and/or valve chamber 151C between the inlet opening 151A and the outlet opening 151B can be produced by actuating the first valve type 151 (for the first time).

Preferably, the first valve type 151 comprises a plurality of, in this case two, through holes 151E, the separation element 151G preferably being arranged between the through holes 151E in a plan view of the valve type 151 (as shown in FIG. 4) or forming a line of symmetry of the first valve type 151. This ensures that the seal or separation element 151G is reliably actuated, opened and/or destroyed and/or that the deflection element 151F is evenly and/or symmetrically raised.

Preferably, two actuation elements 205D of an actuator 205 assigned to the first valve type 151 or to a valve 115 in the first group 153 can be inserted through two corresponding through holes 151E.

As can be seen in particular in FIG. 5 to FIG. 8, the film and/or cover 102 comprises at least one gap 102B in the region of the first valve type 151 and/or the through hole 151E.

Alternatively, the film and/or cover 102 is continuous, in particular in the region of the first valve type 151, it preferably being possible to break through or pierce the film and/or cover 102 by means of the actuation elements 205D, at least in the region of the first valve type 151 and/or the through holes 151E.

Preferably, at least one valve 115 of the first valve type 151 and/or one valve 115 of the second valve type 152 is assigned to the pump apparatus 112 or pump chamber 112C, the storage cavity 108, the measuring or metering cavity 105, the mixing cavity 107, the treatment or reaction cavity 109, the collection cavity 111 and/or the sensor apparatus 113 (respectively), and/or is arranged upstream of, downstream of and/or in the pump apparatus 112 or pump chamber 112C, storage cavity 108, measuring or metering cavity 105, mixing cavity 107, treatment or reaction cavity 109, collection cavity 111 and/or sensor apparatus 113 (respectively).

Preferably, one valve 115 of the first valve type 151 and/or one valve 115 of the second valve type 152 is provided at the inlet and/or outlet of the pump apparatus 112 or pump chamber 112C, the storage cavity 108, the measuring or metering cavity 105, the mixing cavity 107, the treatment or reaction cavity 109, the collection cavity 111 and/or the sensor apparatus 113, respectively, in particular in order to control, in particular to allow, to prevent, to reduce and/or to increase, the flow of fluid therethrough, permanently or temporarily as desired.

More particularly preferably, a valve 115 of the first valve type 151 is arranged at the inlet and/or at the outlet of the receptacle or receiving cavity 104 and/or storage cavities 108, respectively, in particular to release and/or fluidically connect said receptacle or receiving cavity 104 and/or storage cavities 108 after said valves 115 have been actuated for the first time. Advantageously, fluids, in particular reagents F, can thus be released immediately before or for testing of the sample P.

The second valve type 152 preferably comprises one, a plurality of or all of the features of the first valve type 151, which have only been described in conjunction with the first valve type 151 for the sake of simplicity. In particular, the second valve type 152 is basically constructed in the same way as the first valve type 151.

The second valve type 152 preferably comprises a wall 152D, a valve chamber 152C, a first opening 152A and/or a second opening 152B.

The first opening 152A, referred to in the following as the inlet opening 152A, is preferably designed as an inlet of the valve chamber 152C.

The second opening 152B, referred to in the following as the outlet opening 152B, is preferably designed as an outlet of the valve chamber 152C.

Preferably, fluid can flow through the valve chamber 152C by means of the inlet opening 152A and the outlet opening 152B. In particular, a fluid can flow into the valve chamber 152C via the inlet opening 152A and can flow out of the valve chamber 152C via the outlet opening 152B.

However, the flow direction can also be reversed. In particular, the first opening or inlet opening 152A can, at least temporarily, be the outlet, and the second opening or outlet opening 152B can, at least temporarily, be the inlet.

Preferably, the second valve type 152 and/or the valve chamber 152C is designed as an in particular oval depression in the cartridge 100 and/or the support or main body 101, the inlet opening 152A preferably being arranged centrally and the outlet opening 152B preferably being arranged so as to be off-center and/or in an edge region of the valve chamber 152C, as explained in greater detail in the following.

The valve chamber 152C preferably has, in particular when the second valve type 152 is unactuated and/or is open, a volume of greater than 0.1 µl or 0.2 µl, particularly preferably greater than 0.5 µl or 1 µl, in particular greater than 2 µl, and/or less than 10 µl or 8 µl, particularly preferably less than 6 µl or 3 µl.

Particularly preferably, the second valve type 152 or the wall 152D thereof is planar or flat, at least when unactuated.

In particular, the second valve type 152 or the wall thereof 152D is integrated in the surface and/or the support or main body 101 of the cartridge 100 such that the second valve type 152, in particular the surface or wall 152D thereof, at least when it is unactuated, and together with the region of the cartridge 100 and/or support or main body 101 directly adjacent to the second valve type 152, is at least substantially flat or planar or is in the same plane.

Preferably, the wall 152D is formed by a film. In particular, the wall 152D of the second valve type 152 is formed by the layer, film or wall that preferably also forms the deflection element 151F or alternatively the wall 151D of the first valve type 151.

Particularly preferably, the wall 152D is made of and/or injection-molded from plastics material, in particular polypropylene.

The thickness of the wall 152D is preferably less than 0.1 mm, in particular less than 0.05 mm, particularly preferably less than 0.01 mm.

Preferably, the second valve type 152 can be actuated and/or closed and/or the volume of the valve chamber 152C can be reduced by actuation by means of an (assigned) actuator 205 and/or actuation element 205D.

Preferably, the second valve type 152 or the wall 152D thereof can be pressed into the support or main body 101 for actuation.

Particularly preferably, the wall 152D can be pressed into the valve chamber 152C by actuating the second valve type 152, preferably such that the wall 152D closes the inlet opening 152A and/or the outlet opening 152B.

Figure 9:
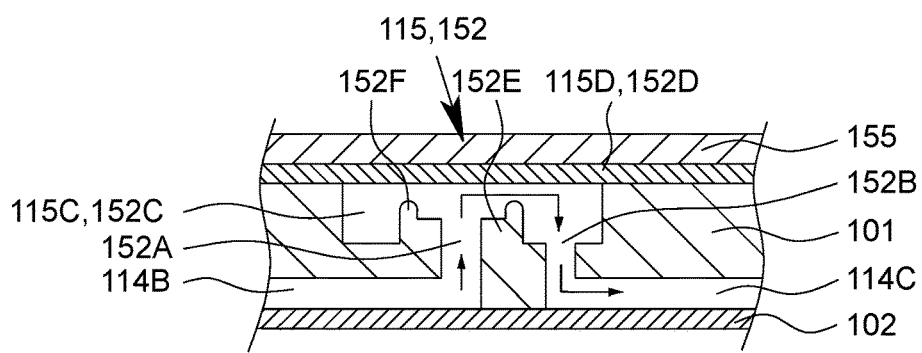
FIG. 9 is a schematic section through a proposed valve of the cartridge according to FIG. 4.

Preferably, the second valve type 152 is designed as a normally open valve and/or the second valve type 152 is open when unactuated, as shown in FIG. 5, FIG. 7 and FIG. 9, preferably such that the sample P, the reagent F and/or another fluid can flow through the second valve type 152.

Preferably, either the inlet opening 152A or the outlet opening 152B is arranged at least substantially centrally in the valve chamber 152C. In particular, either the inlet channel 114B or the outlet channel 114C of the second valve type 152 discharges centrally into the valve chamber 152C.

In the embodiment shown, the inlet channel 114B and/or the inlet opening 152A is preferably arranged centrally and the outlet channel 114C and/or the outlet opening 152B is preferably arranged so as to be off-center and/or in an edge region of the valve chamber 152C. However, other solutions or arrangements are also possible here.

The second valve type 152 preferably comprises a valve seat 152E, the valve seat 152E preferably being designed as an in particular cylindrical raised portion and/or as an in particular cylindrical projection, as shown in FIGS. 5 to 9.

The valve seat 152E is preferably formed in one piece with the support or main body 101 and/or is integrally formed on the support or main body 101.

Preferably, the valve seat 152E projects into the valve chamber 152C, in particular centrally and/or from a side opposite the wall 152D.

In particular, the valve seat 152E is arranged centrally and/or in a freestanding manner in the valve chamber 152C and/or fluid can flow around said valve seat 152E. However, other solutions are also possible here, in particular those in which the valve seat 152E is designed as a separation element or separation wall between the inlet opening 152A and the outlet opening 152B and/or divides the valve chamber 152C.

Preferably, the valve seat 152E comprises or forms the inlet channel 114B and/or inlet opening 152A or the outlet channel 114C and/or outlet opening 152B, in particular on an end face and/or on a side of the valve seat 152E that faces the wall 152D.

In particular, the inlet channel 114B discharges into the valve chamber 152C via the inlet opening 152A on the valve seat 152E, preferably on a side and/or end face of the valve seat 152E that faces the wall 152D, in particular such that a fluid flowing into the valve chamber 152C flows against the wall 152D and/or is deflected thereby.

Preferably, when the second valve type 152 is unactuated, the valve seat 152E and/or the inlet opening 152A is spaced apart from the wall 152D, preferably by more than 1 µm or 112 µm, in particular more than 10 µm or 20 µm, and/or by less than 1 mm or 0.5 mm, in particular less than 100 µm or 80 µm.

Preferably, in particular by mechanically actuating the second valve type 152 and/or the wall 152D, the wall 152D can be pressed towards or against the valve seat 152E and/or the inlet opening 152A, in particular such that the second valve type 152, in particular the inlet opening 152A, is closed and/or a fluidic connection between the inlet opening 152A or inlet channel 114B and the outlet opening 152B or outlet channel 114C is interrupted.

Preferably, the distance between the wall 152D and the valve seat 152E or inlet opening 152A is less than the distance between the wall 152D and the outlet opening 152B, at least when the second valve type 152 is unactuated. Advantageously, the distance required for closing or opening the second valve type 152 is thus reduced.

As shown in particular in FIG. 9, the valve seat 152E is preferably step-shape or beveled, in particular on an end face and/or on a side facing the wall 152D, and/or the valve seat 152E comprises a preferably peripheral bevel or a preferably peripheral projection 152F, in particular on an end face and/or on a side facing the wall 152D.

In particular, the valve seat 152E and/or projection 152F has a wall thickness that decreases, preferably continuously or in a step-shape manner, in the direction of the wall 152D.

Particularly preferably, the valve seat 152E or the projection 152F thereof forms a preferably circular or circumferential contact surface, bearing surface or bearing line for the wall 152D, preferably on an end face and/or on a side facing the wall 152D, the contact surface or bearing surface preferably delimiting or defining the inlet opening 152A at the sides.

In particular, when the second valve type 152 is actuated, the wall 152D rests in a circular or circumferential manner on the valve seat 152E or projection 152F and/or, when the second valve type 152 is actuated, the wall 152D is connected to the valve seat 152E or projection 152F by means of the contact surface, bearing surface or bearing line, in particular such that the inlet channel 114B or the inlet opening 152A is closed and/or sealed and/or such that fluid cannot flow into and/or out of the valve chamber 152C.

In particular, the valve seat 152E or the projection 152F thereof forms a seal together with the wall 152D, at least when actuated.

The second valve type 152 is preferably designed as an automatically opening or self-opening valve. In particular, the second valve type 152 is designed to open automatically, in particular due to restoring forces, following (mechanical) actuation and/or once the actuation is finished or complete.

Preferably, the cartridge 100 comprises an in particular planar cover or layer 155, the cover or layer 155 preferably covering the second valve type 152 and/or the wall 152D, in particular on a side of the wall 152D that is remote from the valve chamber 152C.

Preferably, the cover or layer 155 is connected, particularly preferably adhered, to the wall 152D and/or the support or main body 101 over the entire surface thereof, in particular in a bonded manner.

The cover or layer 155 is preferably made of foamed plastics material and/or of, in particular foamed, polyethylene or polyurethane.

Preferably, the cover or layer 155 is elastically deformable and/or is more elastic or resilient than the wall 152D, and/or the cover or layer 155 has a lower (tensile) elastic modulus, preferably in accordance with the English translations of DIN EN ISO 527-1:2012-06, DIN EN ISO 527-2:2012-06 and/or DIN EN ISO 527-3:2003-07, than the wall 152D.

The elastic modulus as defined in chapter 3.9 of the English translation of DIN EN ISO 527-1:2012-06 is the slope of the stress/strain curve of the material in a specified strain interval and is preferably expressed in megapascals (MPa). It may be calculated either as the chord modulus or as the slope of a linear least-squares regression line in the specified strain interval, as described in further detail in chapter 10.3 of the English translation of DIN EN ISO 527-1:2012-06.

The elastic modulus of cover or layer 155 and/or the wall 152D are alternatively or additionally measured or determined as specified in the English translation of DIN EN ISO 527-3:2003-07, in particular when the thickness of the cover or layer 155 and/or the wall 152D is 1 mm or less.

The methods, apparatus and test specimens involved in a measurement or determination of the elastic modulus are detailed in chapters 4 to 9 as well as Annex C of the English translation of DIN EN ISO 527-1:2012-06 and are further detailed in the English translation of DIN EN ISO 527-2: 2012-06, in particular in chapter 6.

The elastic modulus of the cover or layer 155 is preferably at least 500 Pa, more preferably at least 1 kPa, more preferably at least 3 kPa, most preferably at least 5 kPa, and/or at most 10 MPa, more preferably at most 1 MPa, more preferably at most 100 kPa, most preferably at most 10 kPa.

The elastic modulus of the wall 152D is preferably more than five times, in particular more than ten times, particularly preferably more than a hundred times, and/or less than a thousand times, in particular less than five hundred times, the elastic modulus of the cover or layer 155.

Preferably, the cover or layer 155 comprises a lower indentation hardness, preferably determined in accordance with Method A of DIN EN ISO 2439:2009-05, and/or a lower compression hardness, preferably determined in accordance with DIN EN ISO 3386-1:2015-10, than the wall 152D.

The indentation hardness is preferably the total force required to produce, under specified conditions, a specified indentation of a standard test piece. Preferably, the indentation hardness is expressed in newtons (N). Particularly preferably, the indentation hardness corresponds to the 40%/30 s indentation hardness index determined by Method A described in the English version of DIN EN ISO 2439:2009-05.

A measurement of the indentation hardness is preferably performed with an apparatus as specified in chapter 5, with a test piece as specified in chapter 6, and according to the procedure specified in chapters 7.1, 7.2 and 7.3 of the English version of DIN EN ISO 2439:2009-05.

The compression hardness mentioned above is preferably the compression stress/strain value $CV_{40}$ as defined in chapter 3 of the English translation of DIN EN ISO 3386-1: 2015-10. This means, the compression hardness is the compression stress/strain characteristic for a compression of 40%, wherein the compression stress/strain characteristic is defined as the stress required to produce a compression, at a constant rate of deformation, during the fourth loading cycle of the test specified in chapters 4 to 6 of the English translation of DIN EN ISO 3386-1:2015-10. The test is performed with an apparatus specified in chapter 4, a test piece specified in chapter 5 and following the procedure specified in chapter 6 of the English translation of DIN EN ISO 3386-1:2015-10.

The compression hardness of the cover or layer 155 is preferably at least 0.5 kPa, more preferably at least 1 kPa, more preferably at least 1.5 kPa, most preferably at least 2 kPa, and/or at most 5.5 kPa, more preferably at most 4.5 kPa, more preferably at most 4 kPa, most preferably at most 3.5 kPa.

The indentation hardness of the cover or layer 155 is preferably at least 20 N, more preferably at least 50 N, more preferably at least 90 N, most preferably at least 120 N, and/or at most 300 N, more preferably at most 250 N, more preferably at most 200 N, most preferably at most 150 N.

The indentation hardness and/or the compression hardness and/or the module of compression of the wall 152D is preferably more than twice, in particular more than five times, particularly preferably more than ten times, the indentation hardness, compression hardness or module of compression, respectively, of the cover or layer 155.

Tests have shown that in particular in this way—that is, through the properties relating to the compressibility, compression hardness and/or indentation hardness—and/or by the cover or layer 155, an even and/or complete sealing of the valve seat 152E is enabled by low force needed for closing the valves 115, which is described further below in more detail.

In particular, the cover or layer 155 causes an even distribution of the force when the valve 115 is actuated, so that an evenly and save closing is achieved also with low closing force and/or actuation force.

Preferably, the cover or layer 155 is thicker than the wall 152D, in particular more than twice or three times as thick. Particularly preferably, the thickness of the cover or layer 155 is more than five times in particular more than eight times, particularly preferably more than ten times, the thickness of the wall 152D.

The thickness of the cover or layer 155 is preferably more than 0.3 mm, in particular more than 0.5 mm, particularly preferably more than 0.7 mm, and/or less than 2.0 mm, in particular less than 1.5 mm, particularly preferably less than 1.2 mm, most preferably approximately 1.0 mm.

Preferably, the cover or layer 155 is designed to reset the wall 152D after said wall 152D has been actuated or deformed, and/or is designed to raise or move said wall 152D away from the valve seat 152E and/or the inlet opening 152A, in particular such that the second valve type 152 and/or the valve chamber 152C is opened again and/or fluid can flow therethrough again.

Particularly preferably, the cover or layer 155 is designed as a reinforcement of the wall 152D and/or is designed to increase the restoring forces of the wall 152D.

Preferably, the cover or layer 155 is designed to distribute the force acting on the valve when the second valve type 152 is actuated, and/or is designed to deflect the wall 152D evenly and/or in a planar manner, in particular such that even and/or complete sealing of the valve seat 152E and/or the inlet opening 152A is made possible or facilitated.

In particular, when the second valve type 152 is actuated, the cover or layer 155 makes possible or facilitates even and/or complete sealing of the valve seat 152E and/or the inlet opening 152A on the one hand, and makes possible or facilitates resetting of the wall 152D and/or complete opening of the second valve type 152 and/or the inlet opening 152A, on the other hand, once the actuation of the second valve type 152 is finished or complete.

In particular, the cover or layer 155 makes possible or facilitates even or complete sealing of the valve seat 152E and/or the inlet opening 152A with only low actuation force and/or closing force when the valve 115 and/or the second valve type 152 is actuated or closed, respectively.

The wall 115D and the wall 152D preferably comprise the same properties. In particular, the wall 152D and the wall 115D can be formed in one piece and/or identically.

The analysis device 200 preferably comprises a connection apparatus 203 comprising connections 203A for electrically connecting the cartridge 100 and/or electrical contacts 113E and/or 116A. In this case, an electrical plug-in connection or another electrical connection or the like, which is preferably automatically established or made when the cartridge 100 is received in the analysis device 200, may also be formed in principle.

The analysis device 200 preferably comprises a control apparatus 207 for controlling the sequence of a test and/or for evaluating and/or outputting and/or providing test results.

The analysis device 200 optionally comprises an input apparatus 208, such as a keyboard, a touch screen or the like. Alternatively, or additionally, this may be an interface for example for enabling control by means of a smartphone, a laptop, an external keyboard or the like.

The analysis device 200 preferably comprises a display apparatus 209, such as a screen. Alternatively, or additionally, this may also be an interface for example for outputting test results to external devices, to a smartphone, a laptop, an external screen or the like.

The analysis device 200 preferably comprises an interface 210, for example for outputting test results and/or for connecting to other devices or the like. This may in particular be a wired or wireless interface 210.

For example, a printer may also be connected to the interface 210 in order to output results. Alternatively, or additionally, a printer (not shown) may also be integrated in the analysis device 200 or may be formed by the display apparatus 209.

The analysis device 200 preferably comprises a power supply apparatus 211, which is in particular integrated or externally connected. This may in particular be a battery or an accumulator and/or power pack.

For mobile use, the analysis device 200 and/or the power supply apparatus 211 may in particular be designed such that it can be directly connected to the on-board power supply of a motor vehicle, i.e. can be operated at 12 or 14 V DC current for example.

The analysis device 200 preferably comprises a housing 212. Particularly preferably, the cartridge 100 can be inserted or slid into the housing 212 through an opening (not shown), such as a slot or the like.

The different apparatus 207 to 209 and/or 211, the motor 202A and/or the actuator 205 is/are preferably arranged in the housing 212.

The analysis device 200 is preferably portable or mobile.

The analysis device 200 preferably comprises a retaining element 246, which is assigned to the receptacle or receiving cavity 104, connection 104A and/or closure element 130 in order to keep the receptacle or receiving cavity 104, the connection 104A thereof and/or the closure element 130 closed and/or to secure them in the closed position when the cartridge 100 is received, as shown merely schematically in FIG. 3.

The analysis device 200 preferably comprises one or more sensors 206, in particular for monitoring or controlling the test sequence, as shown schematically in FIG. 3. For example, a liquid front or the presence of liquid in a channel or cavity can be detected, for example optically or capacitively, by means of a sensor 206.

The sensors 206 may be provided in addition to or as an alternative to the sensors or sensor portions 116 arranged on the cartridge 100.

In the following, a preferred sequence of a test using the proposed cartridge 100 and/or the proposed analysis device 200 and/or analysis system 1 and/or in accordance with the proposed method is explained in greater detail.

Preferably, a test is carried out on site, i.e. independently from a central laboratory or the like, for example by a veterinarian or another doctor. Preferably, the present invention is thus used as a point-of-care system.

A sample P is preferably received by the receptacle or receiving cavity 104 of the cartridge 100. For this purpose, the receptacle or receiving cavity 104 or the closure element 130 thereof is preferably first opened. The sample P is then preferably manually introduced or inserted into the receptacle or receiving cavity 104 or placed therein, in particular by means of the transfer apparatus 320.

Once the sample P has been received, the receptacle or receiving cavity 104 or the connection 104A thereof, as well as the vent 104E, if provided, are fluidically closed by the closure element 130, in particular in a liquid-tight and gas-tight manner.

The cartridge 100 is (then) preferably connected to the analysis device 200, in particular is inserted or slid into said analysis device 200.

Preferably, the cartridge 100 is moved towards the pump head 202B, or vice versa, in particular such that said pump head 202B rests on the cartridge 100, in particular on the pump chamber 112C and/or wall 112D, at least in part.

In particular, the cartridge 100 and/or the pump head 202B is moved far enough that the pump head 202B is elastically deformed and/or is adapted at least in part to the surface of the cartridge 100 and/or to the pump chamber 112C.

The pump is then activated and/or the pump head 202B is driven or rotated, in particular in order to start the test or analysis of the sample P.

Preferably, some or all of the actuation elements 205D of the actuators or actuation apparatus 205 are simultaneously, previously or subsequently moved from the first position into the second position and/or are pressed against or into the cartridge 100 and/or the cartridge 100 is moved towards one or more actuation elements 205D, in particular in order to open and/or close the assigned valves 115.

Preferably, the first group 153 and the second group 154 are actuated from different sides 100A, 100B of the cartridge 100, preferably by means of the actuators 205 and/or actuation elements 205D.

Preferably, the first group 153 is actuated, in particular opened, from the front 100A and/or in the first actuation direction B2.

Particularly preferably, at least one valve 115 of the valves 115 and/or the first group 153 is irreversibly opened.

In particular, the storage cavity 108, measuring or metering cavity 105, mixing cavity 107, treatment or reaction cavity 109 and/or collection cavity 111 is/are opened and/or fluidically connected to a preferably directly adjacent channel 114 and/or is/are interconnected, preferably in succession and/or simultaneously and/or in a predefined order, by actuating or opening the preferably upstream and/or downstream valves 115 in particular of the first group 153.

In particular, the storage cavity/cavities 108 or the reagent or reagents, in particular liquid reagent(s) F, therein is/are released, preferably simultaneously, by opening the first group 153 or the assigned valves 115, and/or is/are provided for reactions with the sample P or a component of the sample P.

Particularly preferably, a plurality of valves 115, in particular some or all of the valves 115 in the first group 153, are simultaneously actuated, in particular opened, by means of an assigned actuator 205 of the actuators 205 and/or by means of assigned actuation elements 205D.

Particularly preferably, the valves 115 of the first valve type 151 and/or in the first group 153 are actuated in such a way that the associated seal or separation elements 151G are destroyed and in particular remain permanently open.

In particular, the actuation elements 205D penetrate the assigned through holes 151E from the front 100A, preferably such that the valves 115 of the first valve type 151 and/or in the first group 153 are opened on the back 100B.

Preferably, the valves 115 of the second valve type 152 and/or in the second group 154 are previously, simultaneously or subsequently actuated, in particular closed and/or opened in the desired or required manner or order.

In particular, the valves 115 of the second valve type 152 and/or in the second group 154 are actuated, in particular closed, from the back 100B, preferably by elastic deformation or compression of the flexible wall 115D and/or 152D.

Following or together with the actuation of a valve 115 or of the first or second group 153, 154 and/or together with the activation of the pump, the test on the sample P is carried out in the cartridge 100 in the analysis device 200, preferably at least largely in an automated manner or automatically or self-actingly.

The sample P is removed from the receptacle or receiving cavity 104 or depression 104H at least in part, in this case via the connecting channel or outlet 104C.

In order to cause said sample to be removed and/or to prevent negative pressure from building up in the receptacle or receiving cavity 104, a fluid, in particular air or another gas or a liquid, such as a flushing liquid or the like, is fed to the receptacle or receiving cavity 104, in particular via the ventilation channel or inlet 104B and/or flushing channel or intermediate connection 104D, preferably by means of the pump, the pump apparatus 112 and/or the pump drive 202.

In order to convey the sample P out of the receptacle or receiving cavity 104, the pump or pump apparatus 112 can generate negative pressure on the outlet side and/or overpressure in the receptacle or receiving cavity 104 on the inlet side, in particular via the ventilation channel or inlet 104B and/or flushing channel or intermediate connection 104D. Here, if required, the relatively large collection cavity 111 can be used as a pressure storage means for applying pressure to the receptacle or receiving cavity 104 and/or for equalizing the pressure.

The sample P is treated, prepared and/or metered and/or added to or mixed with reagents, in particular liquid reagents F, in the desired or required manner in the cartridge 100.

For example, the sample P is first fed to the measuring or metering cavity 105 for metering, preferably by means of the pump, the pump apparatus 112 and/or the pump drive 202.

The sample P is then preferably fed to a mixing cavity 107 and mixed with a reagent or a plurality of reagents, in particular with a liquid reagent F or a plurality of liquid reagents F, for example in order to dilute the sample P, to adjust the pH, to lyse cells and/or to carry out other reactions, preferably by means of the pump, the pump apparatus 112 and/or the pump drive 202.

The reagents may also be provided or introduced as dry reagents if required.

The sample P is then preferably fed to at least one treatment or reaction cavity 109, for example in order for a PCR or other treatment to be carried out therein, preferably by means of the pump, the pump apparatus 112 and/or the pump drive 202. Here too, corresponding reagents, in particular liquid reagents F, may again be added or mixed in if required.

The PCR or other treatment may take place or be carried out at specified temperatures. The cartridge 100, the analysis device 200 and/or the proposed analysis system 1 is preferably designed such that the desired temperatures or temperature profiles for the sample P are achieved, maintained or passed through in the respective cavities and channels. In particular, corresponding temperature control or regulation is provided or implemented.

The method sequence, in particular the flow and conveying of the liquids, the mixing and the like, is/are controlled by the analysis device 200 and/or the control apparatus 207, in particular by accordingly activating or actuating the pump drive 202 or pump apparatus 112 and the valves 115.

The analysis device 200 and/or the control apparatus 207 thereof can detect liquid states, for example a liquid front or the presence of liquid, in particular by means of the sensors or sensor portions 116 and/or sensors 206, and can accordingly take this into account for the control.

Additionally or alternatively, also optical detection or measurement can be carried out, for example for the presence of liquid, the fill level of a cavity or the like.

The collection cavity 111 is used in particular to receive excess or used liquids, such as the sample P, reagents F or the like. Alternatively, or additionally, the collection cavity 111 is optionally also used for pressure equalization, since, after the receptacle or receiving cavity 104 has been closed, a fluidically completely closed circuit is preferably formed on or in the cartridge 100.

The collection cavity 111 preferably comprises a flexible or elastically deformable wall, which is in particular formed by the film and/or cover 102 or the like, in particular in order to make the above-mentioned pressure equalization possible. However, other structural solutions are also possible.

The prepared sample P or components thereof, for example amplified DNA sequences, is/are lastly fed to the sensor apparatus 113, preferably by means of the pump, the pump apparatus 112 and/or the pump drive 202.

Preferably, the sample P is then in particular electrochemically measured, for example for the presence of at least one desired target analyte.

The preferably electrical measurement is controlled by the analysis device 200 or the control apparatus 207 and/or the sensor apparatus 113. The test results or measurement results are in particular electrically transmitted to the analysis device 200 or the control apparatus 207 thereof, and are accordingly prepared, analyzed, stored and/or displayed, in particular by the display apparatus 209.

After the test has been carried out, the cartridge 100 is removed from the analysis device 200 again and is preferably disposed of.

The fluid system 103 is preferably designed as a microfluidic system. The same preferably also applies to the cartridge 100, which is in particular designed as a microfluidic cartridge.

In the present invention, the term "microfluidic" is preferably understood to mean volumes of less than 1 ml, particularly preferably less than 0.5 ml, in individual cavities or channels or in a plurality of or all of said cavities or channels.

Preferably, no external liquids have to be fed in or provided while the test is being carried out. This minimizes the risk of inadvertent contamination of the surroundings or the analysis device 200. At the same time, the sensitivity to external disturbances is reduced, since no additional substances need to be introduced in addition to the sample P.

Preferably, the storage cavities 108 are closed by mechanically actuated valves 115, and not by what are known as capillary stops or the like. This also increases the robustness of the cartridge 100 and maintains its functionality.

The cartridge 100 and/or the support or main body 101 is preferably produced in an injection-molding process, particularly preferably from polypropylene, in particular with the depressions, which are preferably only made on one side and are intended to form the cavities and channels, preferably being covered by the film and/or cover 102 only on one side, or on both sides if required, and said cavities and channels being formed in a desired manner as a result. However, other structural solutions are also possible.

Particularly preferably, a plurality of or different closed (gas-tight) circuits are formed on or in the cartridge 100 for different fluids, liquids, reagents F and/or for the sample P, depending on the state of the valves 115 of the fluid system 103, for example a circuit for conveying the sample (receptacle or receiving cavity 104, connection channel or outlet 104C, cavity 105, channel 114, cavity 107, channel 114, pump apparatus 112, channel 114 and back to the receptacle or receiving cavity 104 via the ventilation channel or inlet 104B) and a circuit for conveying the reagents (a cavity 108, channel 114, cavity 107, channel 114, pump apparatus 112 and channel 114 back to the cavity 108).

A plurality or all of the circuits can preferably be operated by the same pump apparatus 112.

One or more circuits are in particular formed by the fluid system 103 together with the receptacle or receiving cavity 104, in order to transfer the sample P from the receptacle or receiving cavity 104 into the fluid system 103.

One or more circuits are preferably formed without the receptacle or receiving cavity 104, i.e. only in the fluid system 103.

The different circuits are used for example to convey the sample P, to treat the sample P with one or more reagents in particular, to feed the treated sample P to the sensor apparatus 113, to flush one or more cavities, or the like.

Individual aspects and features of the present invention and individual method steps may be implemented independently from one another, but also in any desired combination and/or order.

In particular, the present invention relates also to any one of the following aspects which can be realized independently or in any combination, also in combination with any aspects described above or in the following aspects:

1. Cartridge 100 for testing an in particular biological sample P,
the cartridge 100 comprising a fluid system 103 having a plurality of channels 114 and a plurality of valves 115 for controlling the flow of the sample P and/or of a fluid 103 through the fluid system 103,
characterized
in that a first group 153 having one or more valves 115 and a second group 154 having one or more valves 115 can be actuated from different and/or opposing sides of the cartridge 100.
2. Cartridge according to aspect 1, characterized in that the first group 153 is arranged on the front 100A of the cartridge 100 and the second group 154 is arranged on the back 100B of the cartridge 100.
3. Cartridge according to aspect 1, characterized in that the first group 153 and the second group 154 are arranged on a common side and/or flat side of the cartridge 100.
4. Cartridge according to any one of the preceding aspects, characterized in that the first group 153 and/or second group 154 can be mechanically actuated.
5. Cartridge according to any one of the preceding aspects, characterized in that the first group 153 can be opened or closed exclusively and/or irreversibly.
6. Cartridge according to any one of the preceding aspects, characterized in that the second group 154 is designed so as to open or close automatically.
7. Cartridge according to any one of the preceding aspects, characterized in that a plurality or all of the valves 115 comprise a wall or film 115D, 151D, 152D that is flexible and/or elastically deformable at least in part and said valves 115 can be actuated by the wall or film 115D, 151D, 152D being elastically deformed.
8. Cartridge according to any one of the preceding aspects, characterized in that the cartridge 100 comprises an at least substantially planar support 101 and/or is designed to be card-shape, the channels 114, the first group 153 and/or second group 154 and/or some or all of the valves 115 preferably being formed by depressions in the support 101.
9. Analysis system 1 for testing an in particular biological sample P,
the analysis system 1 comprising a fluid system 103 having a plurality of channels 114, a plurality of valves 115 for controlling the flow of the sample P and/or of a fluid through the fluid system 103, and a plurality of actuation apparatus 205 for actuating the valves 115, characterized
in that the analysis system 1 comprises a cartridge 100 for receiving the sample P, the cartridge 100 comprising the fluid system 103 and the valves 115 and being or being able to be arranged between at least two actuation apparatus 205, and/or
in that at least one actuation apparatus 205 is designed to actuate one or more valves 115 from a first side of the cartridge 100 and at least one other actuation apparatus 205 is designed to actuate one or more valves 115 from a second, opposing side of the cartridge 100.

10. Analysis system according to aspect 9, characterized in that the analysis system 1 comprises a cartridge 100 for receiving the sample P and an analysis device 200 for testing the sample P, it preferably being possible for the cartridge 100 to be received by the analysis device 200 at least in part and/or the cartridge preferably being designed according to any one of aspects 1 to 8.

11. Analysis system according to aspect 9 or 10, characterized in that at least one actuation apparatus 205 is designed to actuate a plurality of valves 115 at the same time.

12. Analysis system according to any one of aspects 9 to 11, characterized in that the cartridge 100 and/or at least one valve 115 comprises a through hole 151E for actuating an assigned valve 115 through the through hole 151E.

13. Method for testing in particular a biological sample P, the sample P being received by a cartridge 100 and the cartridge 100 containing the sample P being received by an analysis device 200 at least in part,
a flow of the sample P and/or a flow of fluid being controlled by means of a plurality of valves 115,
the valves 115 being mechanically actuated, characterized
in that a first group 153 having one or more valves 115 and a second group 154 having one or more valves 115 are actuated from different sides of the cartridge 100.

14. Method according to aspect 13, characterized in that the first group 153 is opened by actuation and the second group 154 is closed by actuation.

15. Method according to aspect 13 or 14, characterized in that a plurality of valves 115 are actuated at the same time by means of a common actuation apparatus 205, and/or in that at least one actuation apparatus 205 for actuating a valve 115 passes through the cartridge 100 at least in part.

What is claimed is:

1. An analysis system for testing a biological sample, comprising:
    a cartridge for receiving a sample, and
    an analysis device for testing the sample,
    the cartridge comprising a fluid system having a plurality of channels formed in said cartridge and a plurality of valves for controlling a flow of sample or fluid through the fluid system provided in said cartridge, and
    the analysis device being adapted to at least partially receive the cartridge and comprising a plurality of actuation apparatus for actuating the plurality of valves,
    wherein at least one of the plurality of actuation apparatus is designed to open the plurality of valves at the same time upon actuation,
    wherein the at least one of the plurality of actuation apparatus comprises a drive, a connection element and a plurality of actuation elements arranged next to one another, wherein the connection element connects the plurality of actuation elements to the drive, and
    wherein at least one of the plurality of actuation apparatus is designed to close an associated valve of the plurality of valves upon actuation.

2. The analysis system according to claim 1, wherein the cartridge is adapted to be arranged between at least two of the plurality of actuation apparatus.

3. The analysis system according to claim 1, wherein the cartridge comprises an at least substantially planar or flat support.

4. The analysis system according to claim 3, wherein at least one of the channels and the valves are formed by depressions in the support.

5. The analysis system according to claim 1, wherein the plurality of valves comprises a first group having at least one valve and a second group having at least one valve, the at least one valve of the first group being actuatable from a different side of the cartridge from the at least one valve of the second group.

6. The analysis system according to claim 5, wherein the valves of the first group can be opened irreversibly or closed irreversibly.

7. The analysis system according to claim 6, wherein at least one of the plurality of actuation apparatuses is able to actuate a plurality of valves from the first group simultaneously.

8. An analysis system according to claim 1, wherein the plurality of valves comprises a first group having at least two valves and a second group having at least two valves, wherein the valves of the first group are opened by actuation and the valves of the second group are closed by actuation, wherein one valve of the first group is arranged upstream and one valve of the first group is arranged downstream of a storage cavity in the cartridge, so that the storage cavity of the cartridge is closed in a storage-stable manner by the two valves of the first group when said valves are unactuated, and wherein a valve of the second group is arranged immediately next to each of said upstream and downstream valves of the first group.

9. The analysis system according to claim 1, wherein the cartridge comprises a through-hole and at least one of the valves is actuatable via the through hole.

10. The analysis system according to claim 1 wherein the valves comprise a wall or film that is flexible or elastically deformable at least in part, the valves being actuated by the wall or film being elastically deformed.

11. The analysis system according to claim 1, wherein the actuation apparatuses each comprise a drive.

12. The analysis system according to claim 1, wherein the actuation apparatuses each comprise at least one actuation element.

13. The analysis system according to claim 1, wherein the cartridge comprises a plurality of through holes and wherein each valve of the plurality of valves openable upon actuation comprises a deflection element that can be raised by inserting the actuation elements into the through holes such that the valves are opened.

14. A method for testing a biological sample, comprising:
    receiving a sample in a cartridge and
    at least partially receiving the cartridge containing the sample in an analysis device,
    controlling a flow of the sample in the cartridge by means of a plurality of mechanically actuated valves, and
    opening a plurality of the valves at the same time by means of a common actuation apparatus.

15. The method according to claim 14, further comprising: closing a plurality of the valves by actuation.

16. The method according to claim 14, wherein the common actuation apparatus passes through the cartridge at least in part.

17. A cartridge for testing a biological sample, comprising:
    a fluid system having a plurality of channels and a plurality of valves for controlling a the flow of at least one sample or fluid through the fluid system,
    a storage cavity for a reagent,
    wherein the valves comprise a first group having a plurality of valves and a second group having a plurality of valves, wherein the valves of the first group are openable by actuation and the valves of the second group are closable by actuation, wherein one valve of the first group is arranged upstream of the storage cavity and one valve of the first group is arranged downstream of the storage cavity, so that the storage cavity is closed in a storage-stable manner by the two valves of the first group when said valves are unactuated, and wherein a valve of the second group is arranged immediately next to each of said upstream and downstream valves of the first group.

18. The cartridge according to claim 17, wherein the valves comprise a wall or film that is flexible or elastically deformable at least in part, the valves being actuated by the wall or film being elastically deformed.

19. The cartridge according to claim 17, wherein the cartridge comprises an at least substantially planar or flat support.

20. The cartridge according to claim 19, wherein at least one of the channels, the valves of the first group or the valves of the second group are formed by depressions in the support.

21. The cartridge according to claim 17, wherein the cartridge comprises a plurality of through-holes and the valves of the first group are actuatable via the through holes.

\* \* \* \* \*